(12) United States Patent
Nalci et al.

(10) Patent No.: US 11,949,870 B2
(45) Date of Patent: Apr. 2, 2024

(54) CONTEXT MODELING FOR LOW-FREQUENCY NON-SEPARABLE TRANSFORMATION SIGNALING FOR VIDEO CODING

(71) Applicant: QUALCOMM Incorporated, San Diego, CA (US)

(72) Inventors: Alican Nalci, San Diego, CA (US); Hilmi Enes Egilmez, San Diego, CA (US); Vadim Seregin, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 16/905,663

(22) Filed: Jun. 18, 2020

(65) Prior Publication Data
US 2020/0404276 A1 Dec. 24, 2020

Related U.S. Application Data

(60) Provisional application No. 62/864,939, filed on Jun. 21, 2019.

(51) Int. Cl.
*H04N 19/13* (2014.01)
*H04N 19/176* (2014.01)
(Continued)

(52) U.S. Cl.
CPC .......... *H04N 19/13* (2014.11); *H04N 19/176* (2014.11); *H04N 19/61* (2014.11); *H04N 19/70* (2014.11); *H04N 19/91* (2014.11)

(58) Field of Classification Search
CPC ...... H04N 19/13; H04N 19/176; H04N 19/61; H04N 19/70; H04N 19/91
(Continued)

(56) References Cited

U.S. PATENT DOCUMENTS

| 10,306,229 B2 | 5/2019 | Zhao et al. |
| 10,349,085 B2 | 7/2019 | Said et al. |

(Continued)

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC—Software Manual, Retrieved on Aug. 3, 2016, pp. 1-29.

(Continued)

*Primary Examiner* — Joseph G Ustaris
*Assistant Examiner* — Jimmy S Lee
(74) *Attorney, Agent, or Firm* — Shumaker & Sieffert, PA

(57) ABSTRACT

An example method includes determining a color component of a unit of video data; determining, based at least on the color component, a context for context-adaptive binary arithmetic coding (CABAC) a syntax element that specifies a value of a low-frequency non-separable transform (LFNST) index for the unit of video data; CABAC decoding, based on the determined context and via a syntax structure for the unit of video data, the syntax element that specifies the value of the LFNST index for the unit of video data; and inverse-transforming, based on a transform indicated by the value of the LFNST index, transform coefficients of the unit of video data.

25 Claims, 16 Drawing Sheets

(51) Int. Cl.
*H04N 19/61* (2014.01)
*H04N 19/70* (2014.01)
*H04N 19/91* (2014.01)

(58) Field of Classification Search
USPC .................................................. 375/240.02
See application file for complete search history.

(56) References Cited

U.S. PATENT DOCUMENTS

| | | | |
|---|---|---|---|
| 10,448,053 B2 | 10/2019 | Said et al. | |
| 10,491,922 B2 | 11/2019 | Zhao et al. | |
| 10,681,379 B2 | 6/2020 | Zhao et al. | |
| 2013/0003858 A1* | 1/2013 | Sze | H04N 19/122 375/240.18 |
| 2013/0051459 A1* | 2/2013 | Kirchhoffer | H04N 19/129 375/240.07 |
| 2014/0098859 A1* | 4/2014 | Lim | H04N 19/159 375/240.12 |
| 2014/0376611 A1* | 12/2014 | Kim | H04N 19/186 375/240.02 |
| 2015/0092862 A1* | 4/2015 | Yu | H04N 19/593 375/240.18 |
| 2017/0324643 A1* | 11/2017 | Seregin | H04N 19/60 |
| 2018/0020218 A1 | 1/2018 | Zhao et al. | |
| 2018/0176587 A1* | 6/2018 | Panusopone | H04N 19/189 |
| 2019/0297351 A1 | 9/2019 | Said et al. | |
| 2019/0373261 A1 | 12/2019 | Egilmez et al. | |
| 2019/0387241 A1* | 12/2019 | Kim | H04N 19/46 |
| 2020/0053363 A1* | 2/2020 | Min | H04N 19/463 |
| 2020/0092583 A1 | 3/2020 | Zhao et al. | |
| 2020/0322636 A1 | 10/2020 | Egilmez et al. | |
| 2021/0127112 A1* | 4/2021 | Choi | H04N 19/157 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.
Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 pages.
Chen J., et al., "Algorithm Description for Versatile Video Coding and Test Model 5 (VTM 5)", 14th JVET Meeting; Mar. 19, 2019-Mar. 27, 2019; Geneva; (The Joint Video Exploration Team of ISO/IEC JTC1/SC29/WG11 and ITU-T SG. 16), No. JVET-N1002-v1, May 21, 2019, XP030205194, 70 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Fraunhofer HHI, "Transform Coding Using the Residual Quadtree (RQT)," retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, 4 pp.
Han J., et al., "Towards jointly optimal spatial prediction and adaptive transform in video/image coding," IEEE International Conference on Acoustics, Speech and Signal Processing (ICASSP), pp. 726-729 (Mar. 2010).
International Search Report and Written Opinion—PCT/US2020/038621—ISA/EPO—dated Sep. 11, 2020 (14 pp).
Jain A.K., "A Sinusoidal Family of Unitary Transforms", IEEE Transactions on Pattern Analysis and Machine Intelligence, Oct. 1, 1979, pp. 356-365, IEEE Service Center, XP011242370, ISSN: 0162-8828.
Koo (Lge) M et al: "CE6: Reduced Secondary Transform (RST) (CE6-3.1)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0193, Mar. 27, 2019 (Mar. 27, 2019), XP030256927, 19 pages.
Koo, M., et al., "CE 6-2.1: Reduced Secondary Transform (RST)", JVET-L0133, Joint Video Experts Team (JVET) of ITU-T SG 16 WP 3 and ISO/IEC JTC 1/SC 29/WG 11, 12th Meeting, Macao, CN, Oct. 3-12, 2018, pp. 1-8.
Marpe D., et al., "Context-Based Adaptive Binary Arithmetic Coding in the H.264AVC Video Compression Standard", IEEE Transaction on Circuits and Systems for Video Technology, IEEE Service Center, Piscataway, NJ, US, vol. 13, No. 7, Jul. 1, 2003, pp. 620-636, section III, C.2, p. 632.
Martucci S.A., et al., "Symmetric Convolution and the Discrete Sine and Cosine Transforms", IEEE Transactions on Signal Processing, IEEE Signal Processing Society, vol. 42, No. 5, May 1, 1994, XP000863873, pp. 1038-1051.
Nalci, A., et al., "Non-CE6: An Improved Context Modeling for LFNST", JVET-O0373-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-3.
Salehifar, M., "CE 6.2.6: Reduced Secondary Transform (RST)", JVET-K0099, Joint Video Experts Team (JVET) of ITU-T SG 16 WP 3 and ISO/IEC JTC 1/SC 29/WG 11, 11th Meeting, Ljubljana, SI, Jul. 10-18, 2018, pp. 1-12.
Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.
U.S. Appl. No. 16/899,063, filed Jun. 11, 2020, 75 Pages.
U.S. Appl. No. 15/931,271, filed May 13, 2020, 54 Pages.
U.S. Appl. No. 62/799,410, filed Jan. 31, 2019, 34 Pages.
Wien M, "High Efficiency Video Coding, Coding Tools and specification", Chapter 5, 2015, pp. 133-160.
Zhao (Tencent) X: "Bog Report on CE6: Related Transforms and Transform Signalling Contributions", 127.MPEG Meeting, Jul. 8, 2019-Jul. 12, 2019, Gothenburg, (Motion Picture Expert Group or ISO/IEC JTC1/SC29/WG11), No. m49750, Jul. 7, 2019 (Jul. 7, 2019), XP030208258, 21 pages.
Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.

* cited by examiner

CONTEXT MODELING FOR LOW-FREQUENCY NON-SEPARABLE TRANSFORMATION SIGNALING FOR VIDEO CODING

This application claims the benefit of U.S. Provisional Application No. 62/864,939, filed Jun. 21, 2019, the entire content of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for context modeling and coding of the transform indices/flags for Low-Frequency Non-separable Transformation (LFNST). This disclosure introduces new context models to reduce the signaling overhead of LFNST-related indices/flags for improving the coding efficiency of the context-adaptive binary arithmetic coding (CABAC) engine used in video compression standards. The techniques of this disclosure can be used in advanced video codecs including extensions of HEVC and the next generation of video coding standards such as Versatile Video Coding (VVC/H.266) (Versatile Video Coding (Draft 5) found at http://phenix.it-sudparis.eu/jvet/doc_end_user/documents/14_Geneva/wg11/JVET-N1001-v5.zip).

Video coders (e.g., video encoders and/or video decoders) may signal a syntax element that specifies a value of a low-frequency non-separable transform (LFNST) index for the unit of video data. In some examples, the unit of video data may be a coding unit (CU) of video data (e.g., a LFNST index may be signaled at the CU level). In some examples, the unit of video data may be a transform unit (TU) of video data (e.g., a LFNST index may be signaled at the TU level). In any case, the video coder may signal LFNST index using CABAC. For instance, the video coder may select a specific context for the LFNST index, and code the LFNST index using the selected specific context.

The video coder may select the context based on a wide variety of parameters. Some example parameters include, but are not limited to, block size, color component, partition depth, and number of non-zero transform coefficients. As one specific example and in accordance with one or more techniques of this disclosure, a video coder may select the context for coding a LFNST index for a unit of video data based on a color component of the unit of video data. For instance, the video coder may use a first context where the unit of video data is a luma component and use a second context where the unit of video data is a chroma component. In some examples, the video coder may select different contexts for chroma red and chroma blue. Selecting the context based on color component may provide one or more advantages. For instance, by selected the context for CABAC coding of the LFNST index, the bitrate of video data may be reduced. This is because different color components such as luma and chroma have different usages of LFNST index and has to be separately modeled using different contexts. In other words, the techniques of this disclosure may reduce the amount of data used to represent video data at similar perceptual quality.

As one example, a method of decoding video data includes determining a color component of a unit of video data; determining, based at least on the color component, a context for CABAC a syntax element that specifies a value of a LFNST index thr the unit of video data; CABAC decoding, based on the determined context and via a syntax structure for the unit of video data, the syntax element that specifies the value of the LFNST index for the unit of video data; and inverse-transforming, based on a transform indicated by the value of the LFNST index, transform coefficients of the unit of video data.

As another example, a method of encoding video data includes selecting, from a plurality of LFNSTs, a LFNST having an LFNST index; transforming, using the LFNST, transform coefficients of a unit of video data; determining a color component of the unit of video data; determining, based at least on the color component, a context for CABAC a syntax element that specifies the value of the LFNST index for the unit of video data; and CABAC encoding, based on the determined context and via a syntax structure for the unit of video data, the syntax element that specifies the value of the LFNST index for the unit of video data.

As another example, a device for coding video data includes a memory; and one or more processors implemented in circuitry and configured to: determine a color component of a unit of video data; determine, based at least on the color component, a context for CABAC a syntax element that specifies a value of a LFNST index for the unit of video data; CABAC code, based on the determined context and via a syntax structure for the unit of video data, the syntax element that specifies the value of the LFNST index for the unit of video data; and transform, based on a transform indicated by the value of the LFNST index, transform coefficients of the unit of video data.

As another example, a computer-readable storage medium stores instructions that, when executed, cause one or more processors of a video coder to determine a color component of a unit of video data; determine, based at least on the color component, a context for CABAC a syntax element that specifies a value of a LFNST index for the unit of video data; CABAC code, based on the determined context and via a syntax structure for the unit of video data, the syntax element that specifies the value of the LFNST index for the unit of video data; and transform, based on a transform indicated by the value of the LFNST index, transform coefficients of the unit of video data.

As another example, a video coder includes means for determining a color component of a unit of video data; means for determining, based at least on the color component, a context for CABAC a syntax element that specifies a value of a LFNST index for the unit of video data; means for CABAC coding, based on the determined context and via a syntax structure for the unit of video data, the syntax element that specifies the value of the LFNST index for the unit of video data; and means for transforming, based on a transform indicated by the value of the LFNST index, transform coefficients of the unit of video data.

The details of one or more examples are set forth in the accompanying drawings and the description below. Other features, objects, and advantages will be apparent from the description, drawings, and claims.

DETAILED DESCRIPTION

Figure 1:
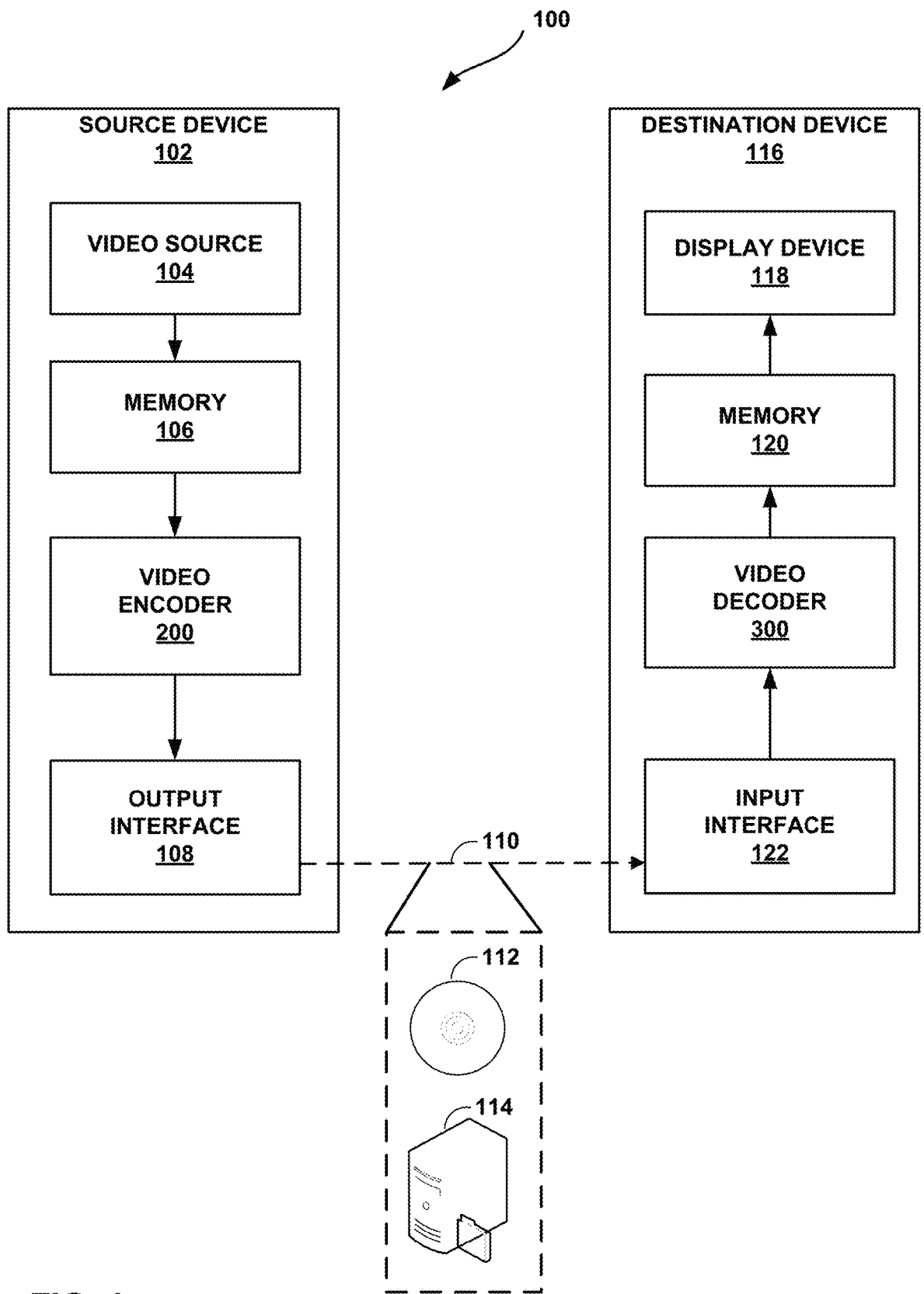
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaining consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for transform coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for transform coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v5 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YIN (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks.

Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to selectively context code a value of a low-frequency non-separable transform (LFNST) index or flag based on one or more parameters. The video coder (e.g., video encoder 200 and/or video decoder 300) may select the context based on a wide variety of parameters. Some example parameters include, but are not limited to, block size, color component, partition depth, and number of non-zero transform coefficients. As one specific example and in accordance with one or more techniques of this disclosure, the video coder may select the context for coding a LFNST index for a unit of video data based on a color component of the unit of video data. For instance, the video coder may use a first context where the unit of video data is a luma component and use a second context where the unit of video data is a chroma component. Selecting the context based on color component may provide one or more advantages. For instance, by selected the context for CABAC coding of the LFNST index, the bitrate of video data may be reduced, e.g., because certain LFNSTs may be more likely to be used for certain color components. In other words, the techniques of this disclosure may reduce the amount of data used to represent video data at similar perceptual quality. Thus, these techniques may improve the field of video coding by reducing bitrate of a bitstream including video data.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
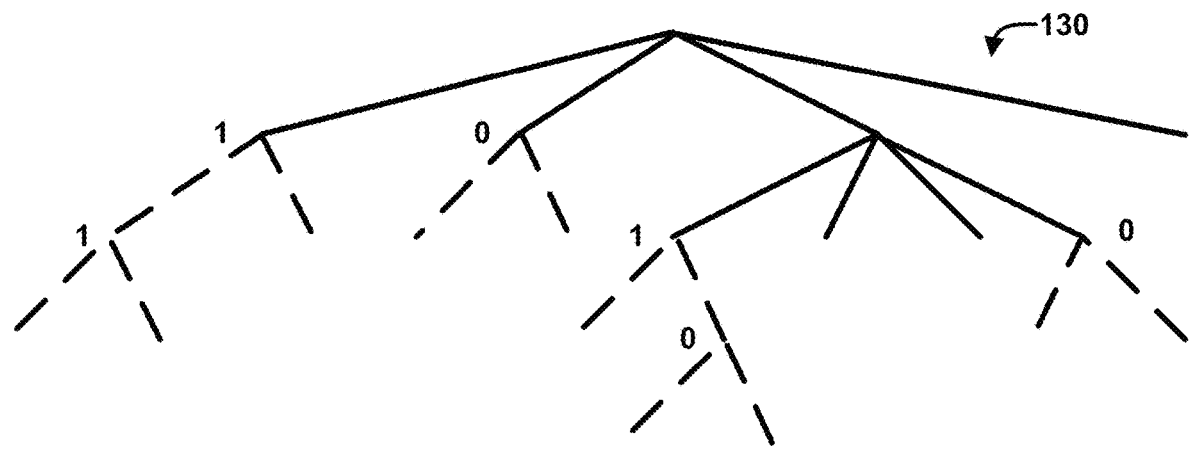
FIGS. 2A and 2B are conceptual diagrams illustrating an example quadtree binary tree (QTBT) structure, and a corresponding coding tree unit (cm).
Figure 2B:
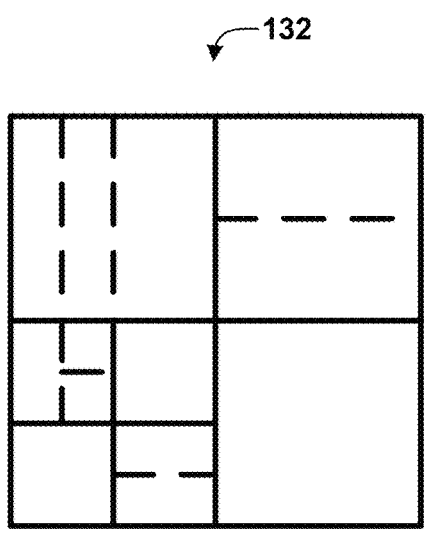

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (lama samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
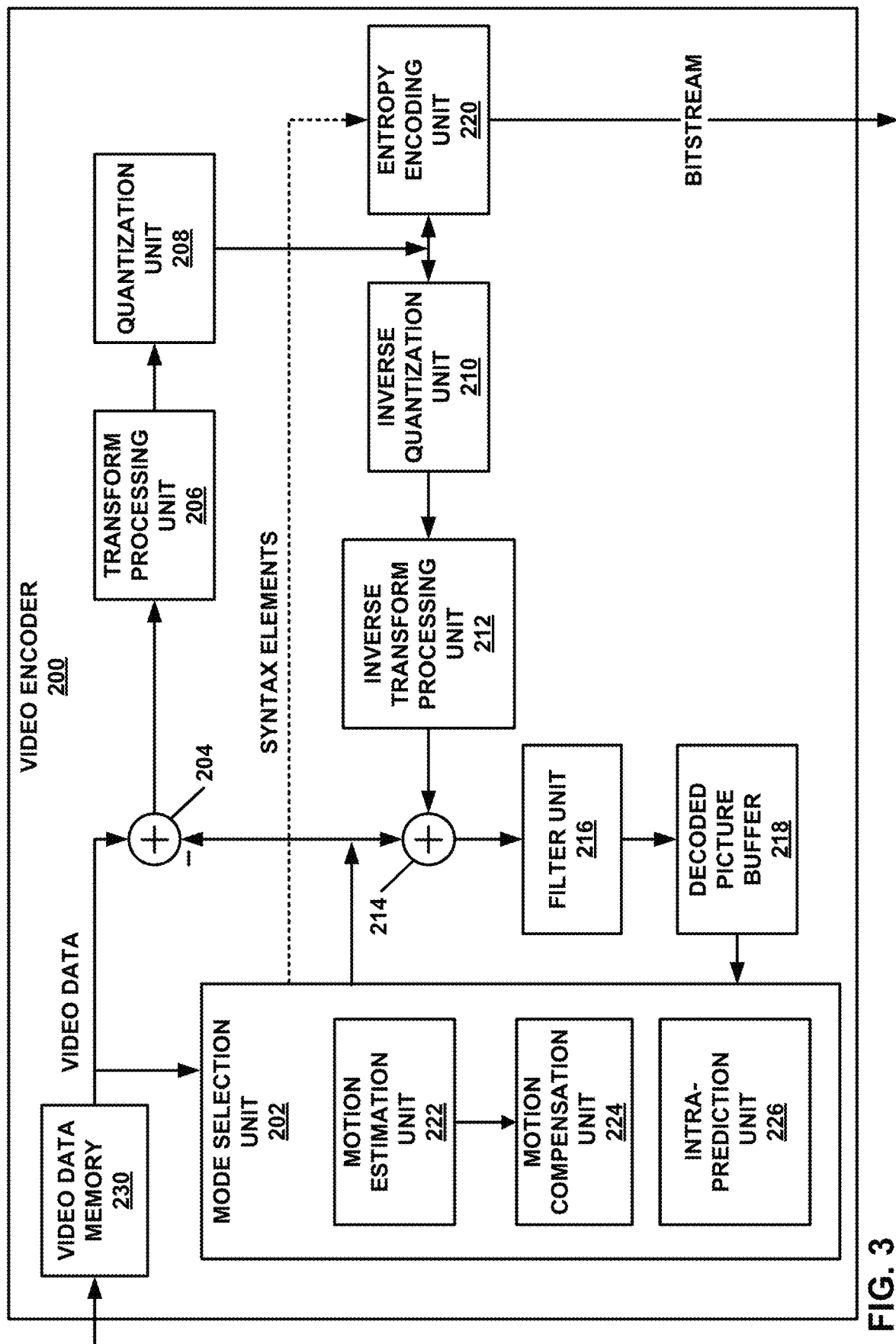
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and 2N×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion)

based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded. Further details of one example of entropy encoding unit 220 are discussed below with reference to FIG. 12.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

As will be explained in more detail below, video encoder 200 represents an example of a device configured to encode video data including a memory configured to store video data, and one or more processing units implemented in circuitry and configured to selectively context code a value of a low-frequency non-separable transform index or flag, and transform the block of video data in accordance with the low-frequency non-separable transform index or flag.

Figure 4:
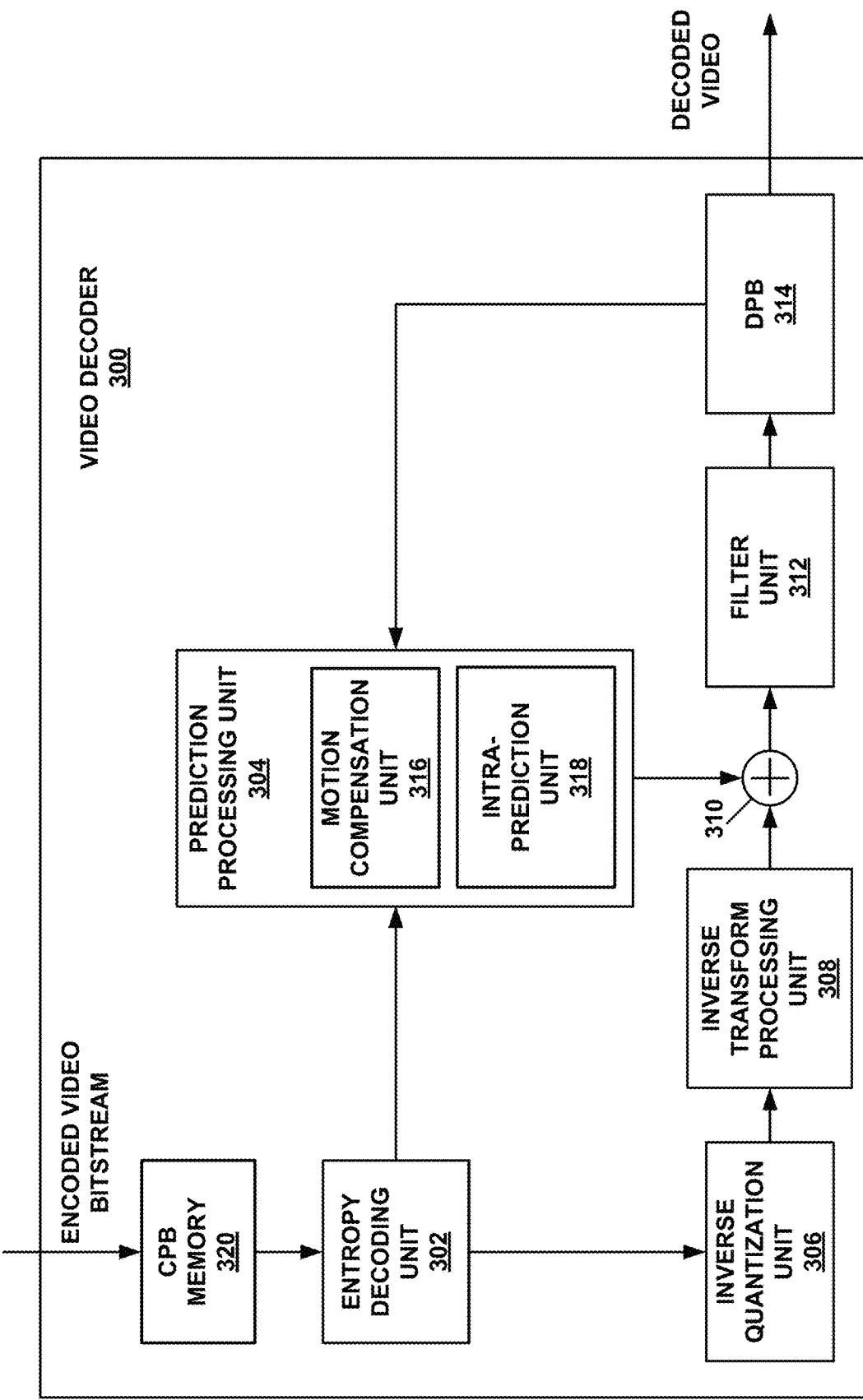
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code)) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients. Further details of one example of entropy decoding unit 302 are discussed below with reference to FIG. 13.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, as will be explained in more detail below, video decoder 300 represents an example of a video decoding device including a memory configured to store video data, and one or more processing units implemented in circuitry and configured to selectively context code a value of a low-frequency non-separable transform index or flag, and transform the block of video data in accordance with the low-frequency non-separable transform index or flag.

An Overview of transform related tools. In example video coding standards prior to HEVC, only a fixed separable transform or fixed separable inverse transform is used in video encoding and video decoding, where a type-2 discrete cosine transform (DCT-2) is used both vertically and horizontally. In HEVC, in addition to DCT-2, a type-7 discrete sine transform (DST-7) is also employed for 4×4 blocks as a fixed separable transform.

The following co-pending U.S. Patent and U.S. Patent Applications describe multiple transform selection (MIS) techniques: U.S. Pat. No. 10,306,229, issued on May 28, 2019, U.S. Patent Publication No. 2018/0020218, published Jan. 18, 2018, and U.S. Patent Publication No. 2019/0373261, published Dec. 5, 2019. Note that MIS was previously called Adaptive Multiple Transforms (AMI). MIS techniques are generally the same as previously-described AMI techniques. An example of MIS described in U.S. Patent Publication No. 2019/0373261 was adopted in the Joint Experimental Model 7.0 (JEM-7.0) of the Joint Video Experts Team (JVET) (e.g., see hhi.fraunhofer.de/fields-of-competence/image-processing/research-groups/image-video-coding/hevc-high-efficiency-video-coding/transform-coding-using-the-residual-quadtree-rqt.htttml), and later a simplified version of MIS was adopted in VVC.

In general, when encoding or decoding a transform block of transform coefficients using MIS, video encoder 200 and video decoder 300 may determine one or more separable transforms of a plurality of separable transforms to use. By including more choices of separable transforms, coding efficiency may be increased as the transform(s) chosen may be more adapted to the content being coded.

Figure 5:
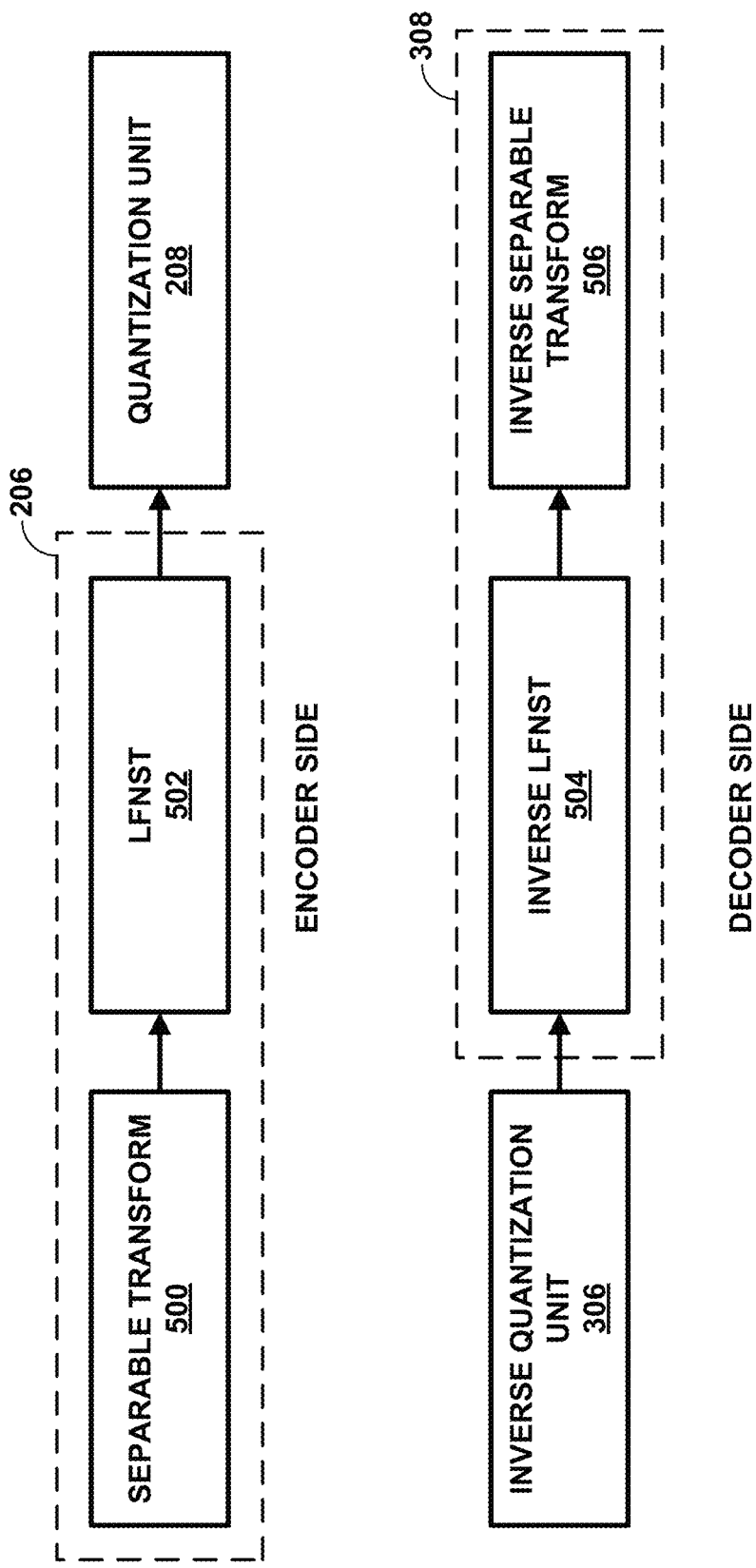
FIG. 5 is a block diagram illustrating low-frequency non-separable transform (LFNST) at an encoder and a decoder.

FIG. 5 is an illustration of an example Low-Frequency Non-Separable Transform (LFNST) at encoder and decoder sides (e.g., video encoder 200 and video decoder 300), where the use of an LFNST introduces a new stage between separable transformation and quantization in a codec. As shown in FIG. 5, at the encoder side (e.g., video encoder 200), transform processing unit 206 may first apply a separable transform 500 on a transform block to obtain transform coefficients. Transform processing unit 206 may then apply an LFNST 502 to a portion (e.g., an LFNST region) of the transform coefficients of the transform block. As described above, transform processing unit 206 may apply a zero-out process in conjunction with the LFNST. Quantization unit 208 may then quantize the resulting transform coefficients before entropy encoding.

At the decoder side e.g., video decoder 300), inverse quantization unit 306 first inverse quantizes entropy decoded transform coefficients (see FIG. 4) in a transform block. Then inverse transform processing unit 308 of video decoder 300 applies an inverse LFNST 504 to an LFSNT region of the transform block. Then inverse transform processing unit 308 applies an inverse separable transform 506 to results of the inverse LFNST to produce a residual block.

An example LFNST (e.g., as illustrated in FIG. 5) was used in JEM-7.0 to further improve the coding efficiency of MTS, where an implementation of LFNST is based on an example Hyper-Cube Givens Transform (HyGT) described in U.S. Pat. No. 10,448,053, filed Feb. 14, 2017. U.S. Pat. No. 10,491,922, filed Sep. 20, 2016, U.S. Patent Publication No. 2017/0094314, published Mar. 30, 2017, U.S. Pat. No. 10,349,085, filed Feb. 14, 2017, and U.S. patent application Ser. No. 16/354,007, filed Mar. 25, 2019 describe other example designs and further details. Recently, LFNST has been adopted in VVC standard (see JVET-N0193, Reduced Secondary Transform (RST) (CE6-3.1), available online: http://phenix.itsudparis.eu/jvet/doc_end_user/documents/14_Geneva/wg11/JVET-N0193-v5.zip. Note that LFNST was previously called a non-separable secondary transform (NSST) or secondary transform.

In the LFNST design in VVC Draft 5, an encoder (e.g., video encoder 200) may be configured to perform a zero-out operation that keeps the K-lowest frequency transform coefficients as is (e.g., the values of the K-lowest frequency transform coefficients are not zeroed out). The K-lowest frequency transform coefficients are transformed by an LFNST of size N (e.g., N=64 for an 8×8 LFNST region). A decoder (e.g., video decoder 300) reconstructs the separable coefficients (e.g., MTS coefficients) by only using those K coefficients (also referred to as K LFNST coefficients). In VVC Draft 5, such a zero-out process is done only for LFNSTs of sizes 4×4 and 8×8, normatively, where the decoder implicitly infers (assumes or determines without receiving signaling) that the values of the remaining N−K higher frequency transform coefficients are set to have a value of zero and K LFNST coefficients are used for reconstruction.

Figure 6:
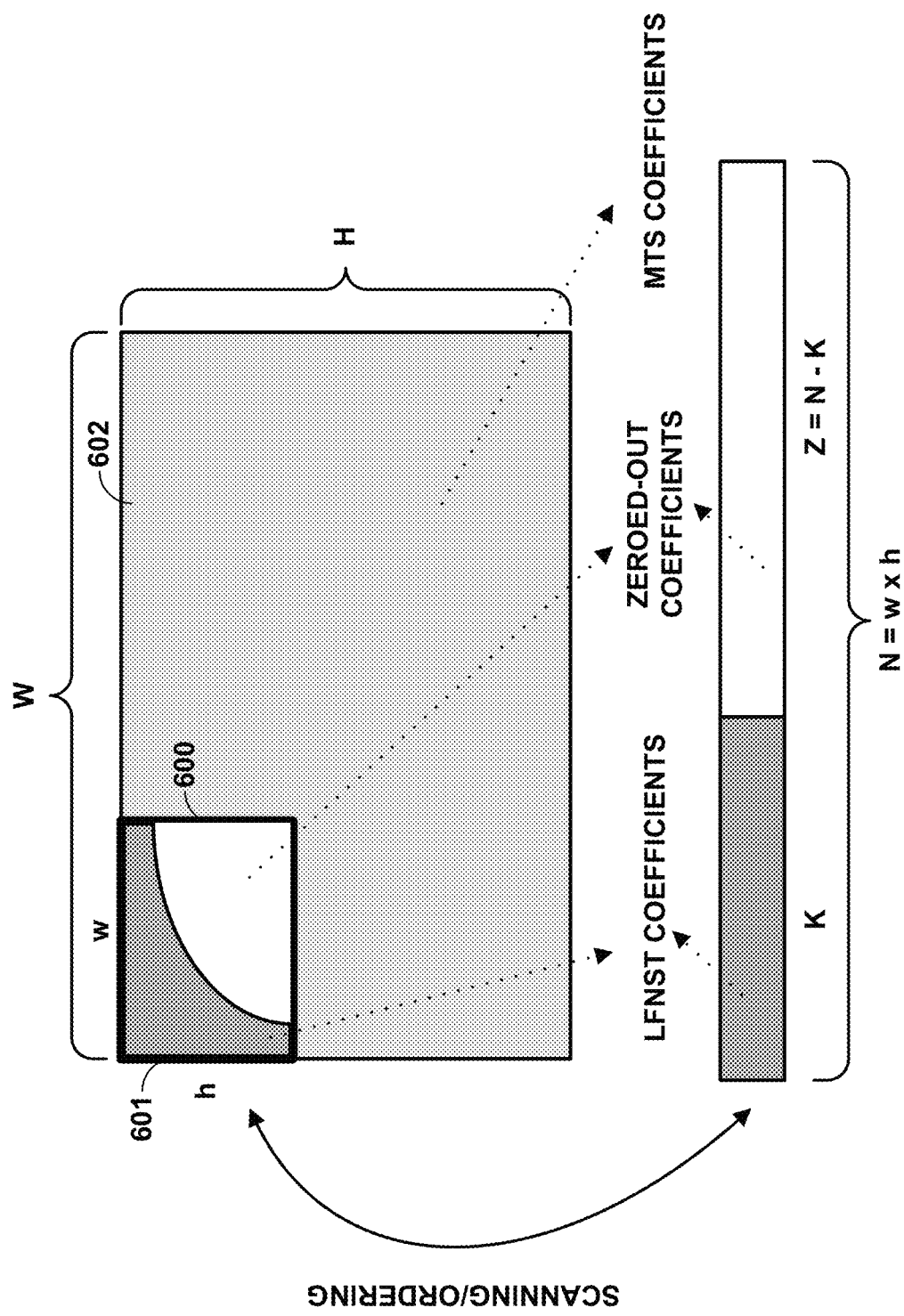
FIG. 6 is a conceptual diagram illustrating coefficients obtained after applying LFNST to a block with zero-out.

FIG. 6 is a representative illustration of transform coefficients obtained after applying an LFNST of size N to transform block 602 of size H×W with zero-out, where Z transform coefficients out of N transform coefficients are zeroed-out, and K coefficients are retained. As shown in FIG. 6, video encoder 200 applies a separable transform (e.g., using MIS techniques) to transform block 602 to obtain the MIS coefficients. Video encoder 200 then applies the LFNST to LFNST region 600 (having a size of h×w) of transform block 602. The dark region 601 of LFNST region 600 are the K coefficients that are retained (e.g., the LFNST coefficients). The white region of LFNST region 600 are the Z (N-K) coefficients that are zeroed out (e.g., the zeroed-out coefficients).

As described in U.S. Pat. No. 10,491,922, filed Sep. 20, 2016, U.S. Patent Publication No. 2017/0094314, published Mar. 30, 2017, and U.S. Provisional Application No. 62/799,410, filed Jan. 31, 2019, an LFNST may be performed by first converting the 2-D sub-block that is the LFNST region (e.g., LFNST region 600 in FIG. 6) into a 1-D list (or vector) of transform coefficients via pre-defined scanning/ordering; and then applying the transform on a subset of the transform coefficients (e.g., the transform coefficients that are not zeroed-out).

Figure 7:
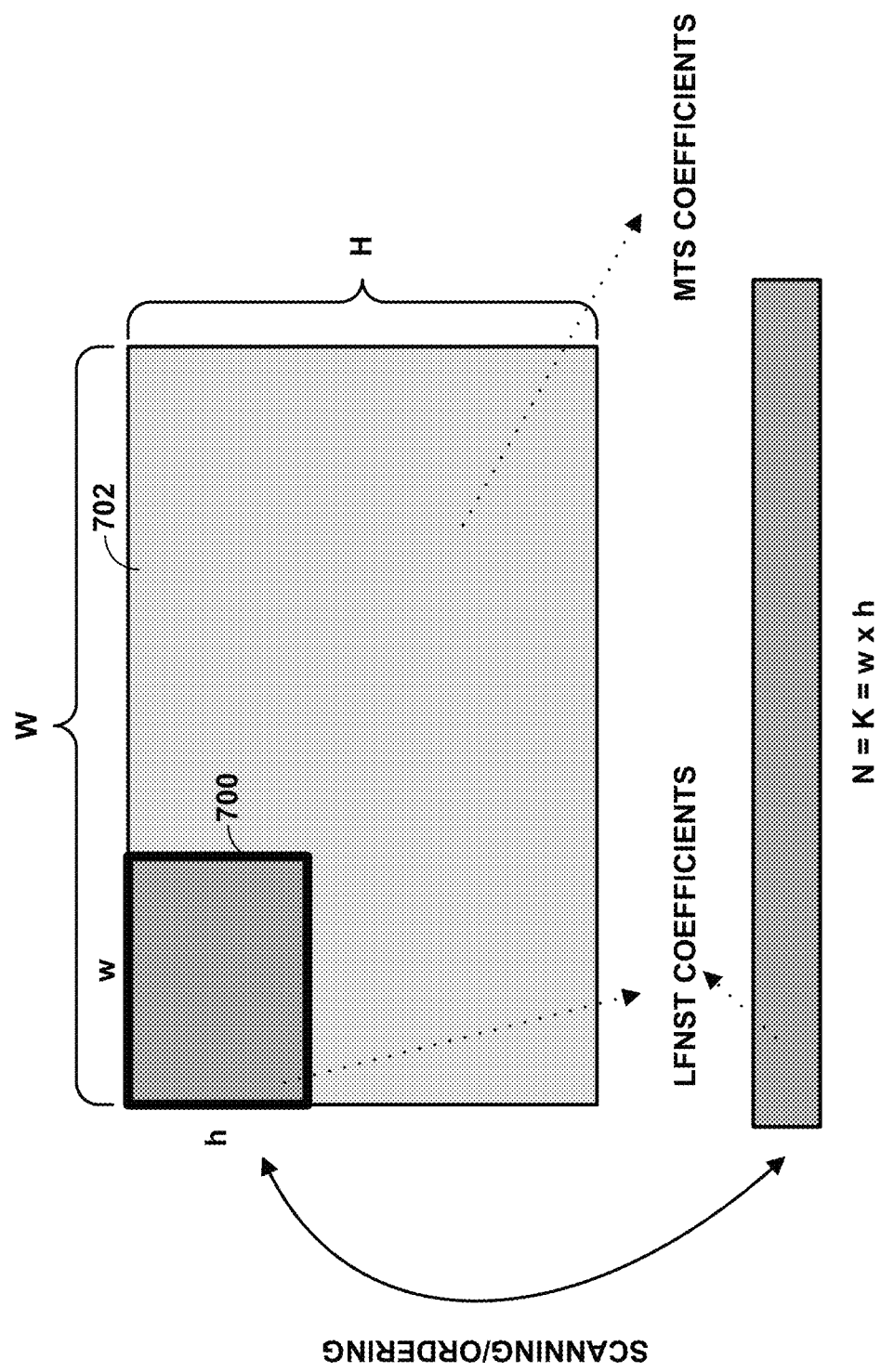
FIG. 7 is a conceptual diagram illustrating coefficients obtained after applying LFNST to a block without zero-out.

FIG. 7 shows an example of separable transform coefficients (MTS) and LFNST coefficients obtained without any zeroing-out. As shown in FIG. 7, video encoder 200 applies a separable transform (e.g., using MTS techniques) to transform block 702 (having a size of H×W) to obtain the MTS coefficients. Video encoder 200 then applies the LFNST to LFNST region 700 (having a size of h×w) of transform block 702. In the example of FIG. 7, all N coefficients of LFNST region 700 are retained (e.g., the LFNST coefficients). That is, no zero-out is performed in the example of FIG. 7.

Figure 8:
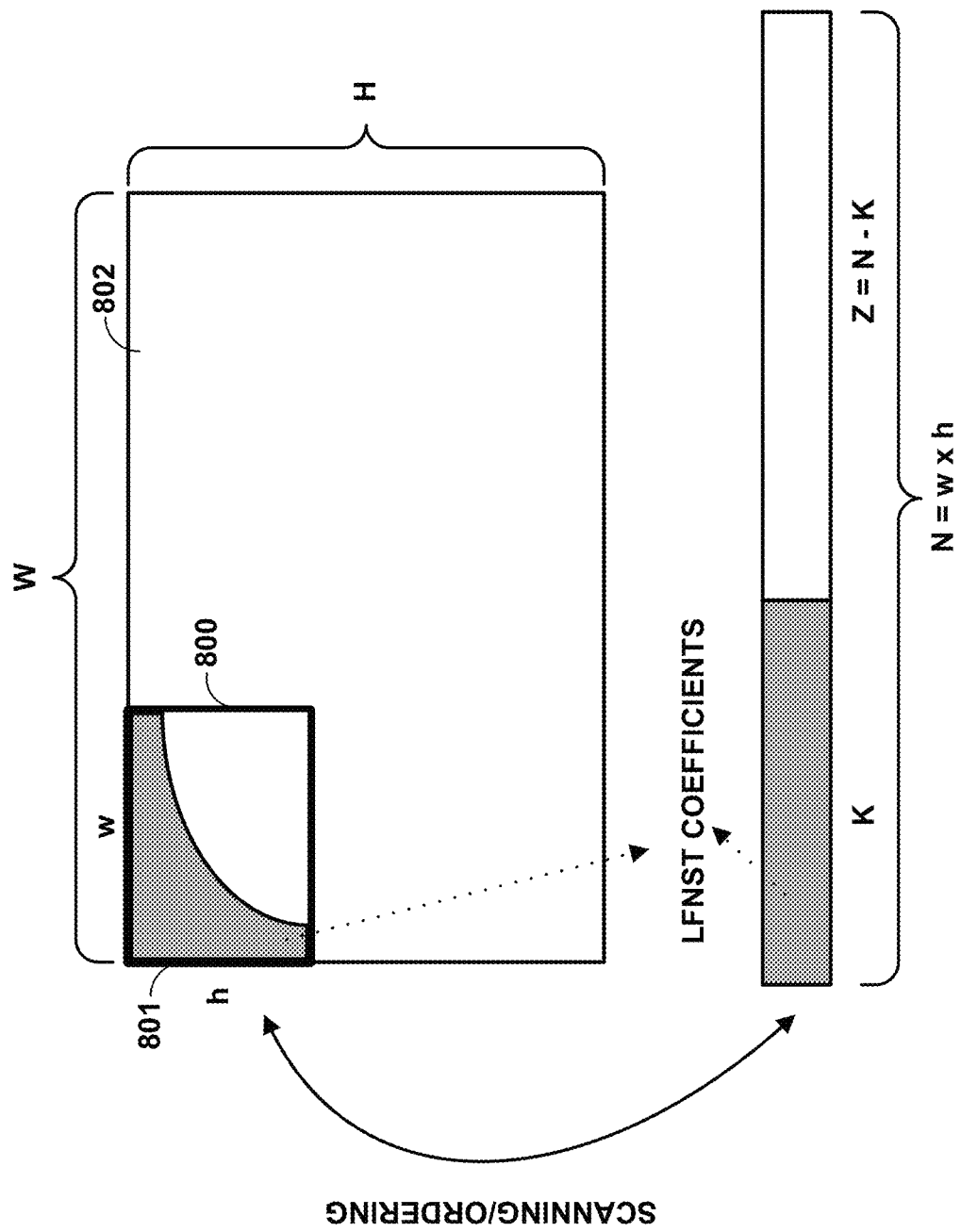
FIG. 8 is a conceptual diagram illustrating coefficients obtained after applying LFNST to a block with zero-out according to the techniques of this disclosure.
Figure 9:
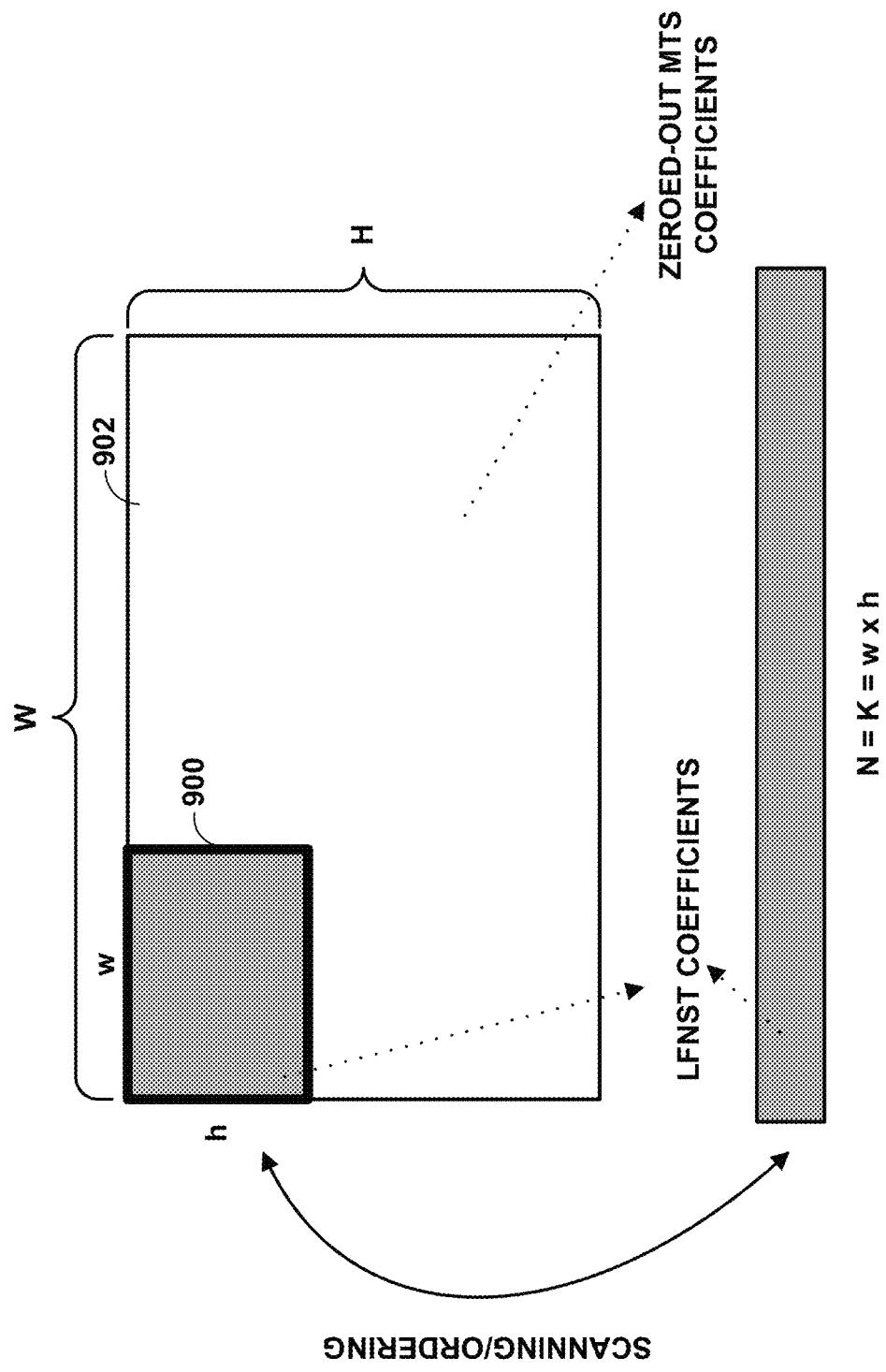
FIG. 9 is a conceptual diagram illustrating coefficients obtained after applying LFNST to a block without zero-out according to the techniques of this disclosure.

FIGS. 8 and 9 show examples of LFNST, proposed in U.S. Provisional Application No. 62/799,410, filed Jan. 31, 2019 and U.S. Provisional Application No. 62/849,689, filed May 17, 2019 (hereinafter, the "'689 application"), which apply zero-out on coefficients outside of the LFNST region. In particular, FIG. 8 shows an example where LFNST coefficients are obtained by applying LFNST and zeroing-out both the Z highest frequency coefficients in LFNST region (in block 800) and the MIS coefficients outside of the LFNST region (outside block 800). Additionally, FIG. 9 shows an example where LFNST coefficients are obtained by applying LFNST and only zeroing-out MIS coefficients outside of the LFNST region (outside block 900).

The following section will describe binary arithmetic coding (BAC) and context adaptive binary arithmetic coding (CABAC) techniques in more detail. BAC, in general, is a recursive interval-subdividing procedure. BAC is used to encode bins in the CABAC process in the H.264/AVC and H.265/HEVC video coding standards. The output of the BAC coder is a binary stream that represents a value or pointer to a probability within a final coded probability interval. The probability interval is specified by a range ('range') and a lower end value ('low'). Range is the extension of the coding/probability interval. Low is the lower bound of the coding/probability interval.

Application of arithmetic coding to video coding is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003. CABAC involves three main functions, namely, binarization, context modeling, and arithmetic coding. Binarization refers to the function of mapping syntax elements to binary symbols (or "bins"). Binary symbols may also be referred to as "bin strings." Context modeling refers to the function of estimating the probability of the various bins. Arithmetic coding refers to the subsequent function of compressing the bins to bits, based on the estimated probability. Various devices and/or modules thereof, such as a binary arithmetic coder, may perform the function of arithmetic coding.

Several different binarization processes are used in HEVC, including unary (U), truncated unary (TU), kth-order Exp-Golomb (EGk), and fixed length (FL). Details of various binarization processes are described in V. Sze and M. Budagavi, "High throughput CABAC entropy coding in HEVC," IEEE Transactions on Circuits and Systems for Video Technology (TCSVT), vol. 22, no. 12, pp. 1778-1791, December 2012.

Each context (i.e., probability model) in CABAC is represented by a state. Each state ($\sigma$) implicitly represents a probability ($p_\sigma$) of a particular symbol (e.g., a bin) being the Least Probable Symbol (LPS). A symbol can be an LPS or a Most Probable Symbol (MPS). Symbols are binary, and as such, the MPS and the LPS can be 0 or 1. The probability is estimated for the corresponding context and used (implicitly) to entropy code the symbol using the arithmetic coder.

The process of BAC is handled by a state machine that changes its internal values 'range' and low' depending on the context to code and the value of the bin being coded. Depending on the state of a context (that is, its probability), the range is divided into rangeMPS$_\sigma$ (range of the most probable symbol in state$_\sigma$) and rangeLPS$_\sigma$ (range of the least probable symbol in state$_\sigma$). In theory, the rangeLPS$_\sigma$ value of a probability state$_\sigma$ is derived by a multiplication:

$$\text{range}LPS_\sigma = \text{range} \times p_\sigma,$$

where $p_\sigma$ is the probability to select the LPS. Of course, the probability of MPS is $1-p_\sigma$. Equivalently, the rangeMPS$_\sigma$ is equal to range minus rangeLPS$_\sigma$. BAC iteratively updates the range depending on the state of the context bin to code, the current range, and the value of the bin being coded (i.e., is the bin equal to the LPS or the MPS).

Figure 10A:
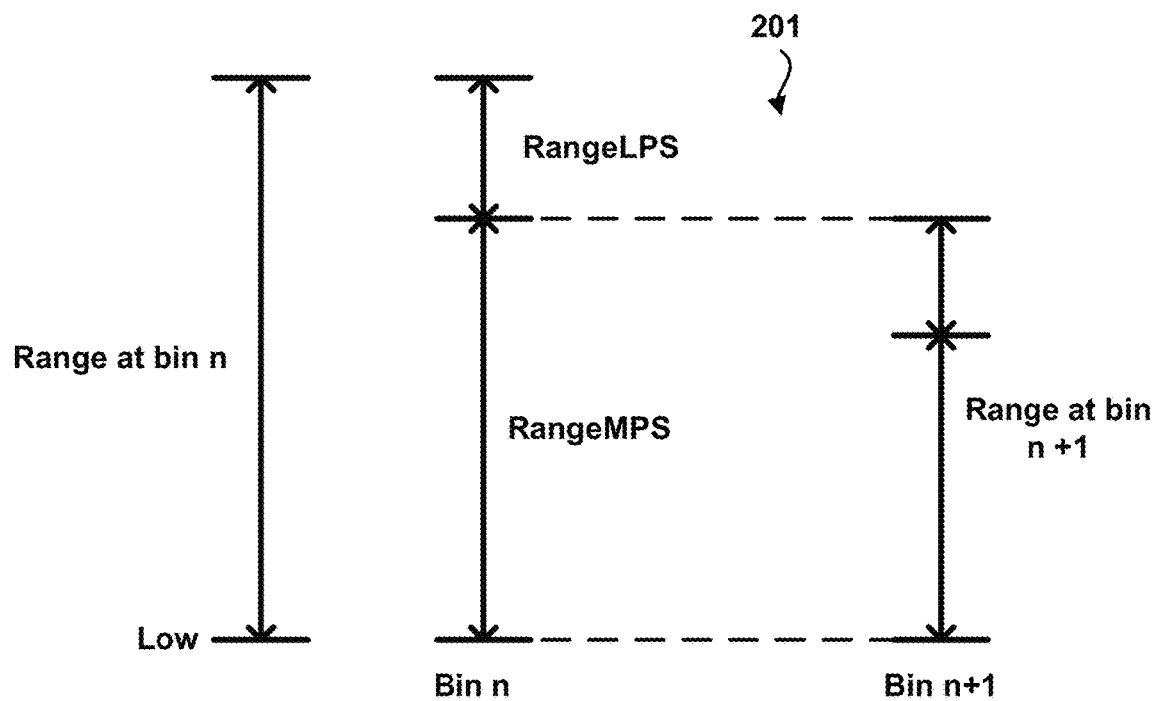
FIGS. 10A and 10B are conceptual diagrams illustrating a range update process in binary arithmetic coding.
Figure 10B:
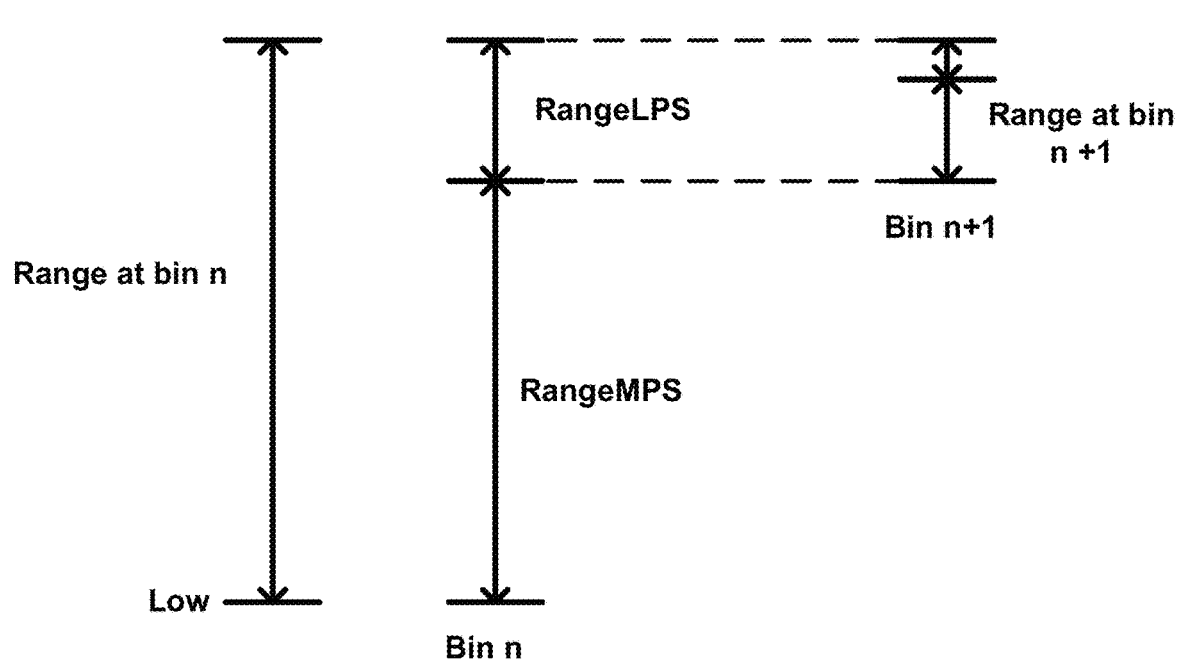

FIGS. 10A and 10B show examples of this process at bin n. In example 201 of FIG. 10A, the range at bin n includes the RangeMPS and RangeLPS given by the probability of the LPS ($p_\sigma$) given a certain context state ($\sigma$). Example 201 shows the update of the range at bin n+1 when the value of bin n is equal to the MPS. In this example, the low stays the same, but the value of the range at bin n+1 is reduced to the value of RangeMPS at bin n. Example 203 of FIG. 10B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 11:
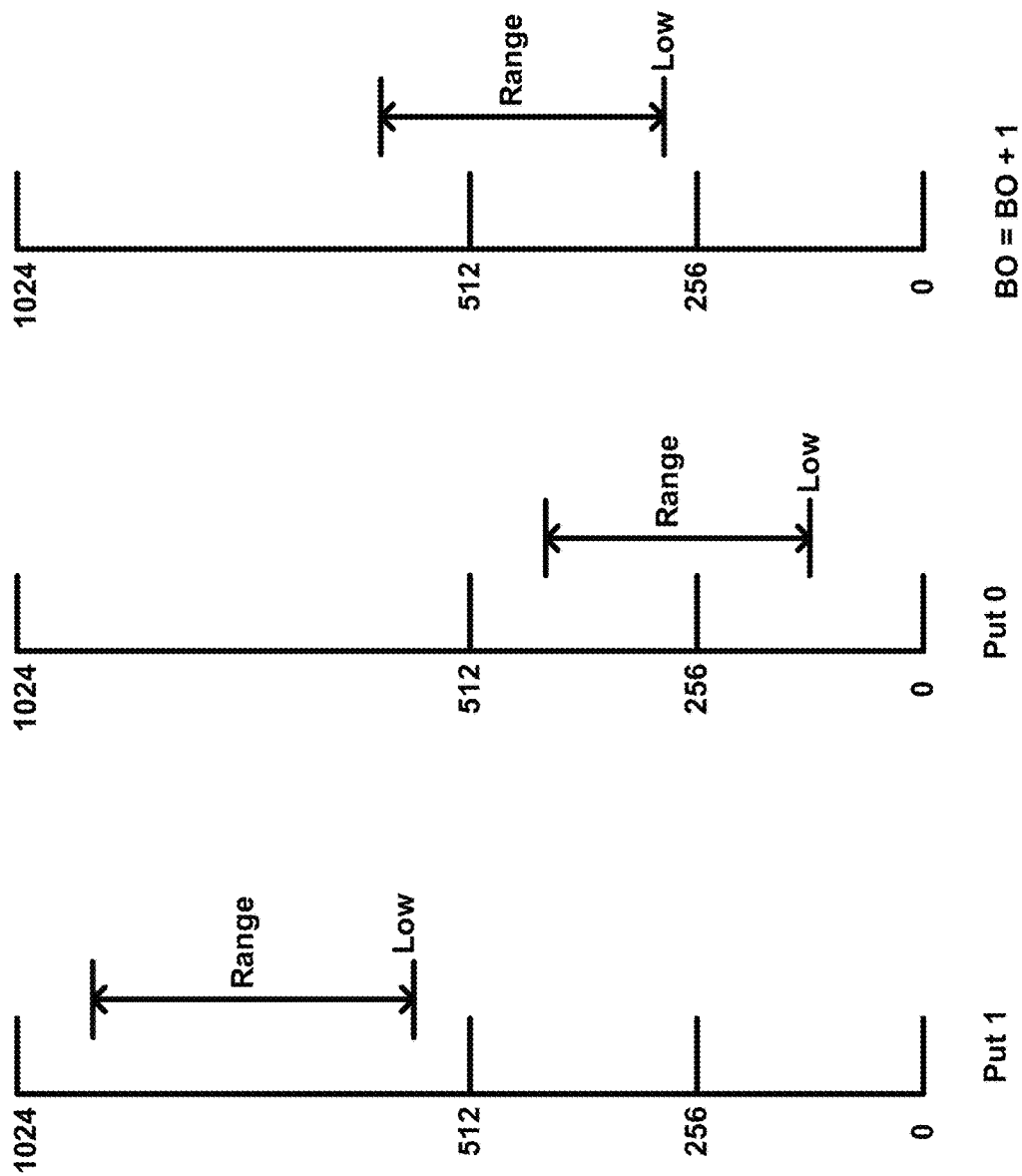
FIG. 11 is a conceptual diagram illustrating an output process in binary arithmetic coding.

In HEVC, the range is expressed with 9 bits and the low with 10 bits. There is a renormalization process to maintain the range and low values at sufficient precision. The renormalization occurs whenever the range is less than 256, Therefore, the range is always equal or larger than 256 after renormalization. Depending on the values of range and low, the BAC outputs to the bitstream, a '0,' or a '1,' or updates an internal variable (called BO: bits-outstanding) to keep for future outputs. FIG. 11 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

As discussed above, in video compression standards such as VVC, arithmetic coding methods are used to provide high compression efficiency. This is achieved by first transforming the non-binary syntax elements into a binary representation (e.g. 0, 1) using a process called binarization. The resulting transformed entries are called as bins or bin-strings. These bins or bin strings are then fed into the arithmetic coding process. FIG. 10 illustrates an example context adaptive binary arithmetic coding (CABAC) encoding stage. The example CABAC encoding stage may be implemented in a video encoder, such as by entropy encoding unit 220 of video encoder 200 of FIG. 3.

In VVC Draft 5, context-adaptive binary arithmetic coding (CABAC) is used for generating the bins through the binarization process. For each coded bin value, an appropriate context model is selected. These context models are used for encoding each bin value into output bits based on the bin probability values. CABAC engine bypasses context-modeling and bin encoding when the bin is equally probable to be 0 or 1. This is the bypass coding stage discussed below. Otherwise, an appropriate context model is specified as the bin values are encoded and models based on the probability of bin-values. Contexts are adapted as the encoder encodes more bins. Lastly, the context-coded bin values or raw bitstreams are transmitted or otherwise provided to the decoder.

Figure 12:
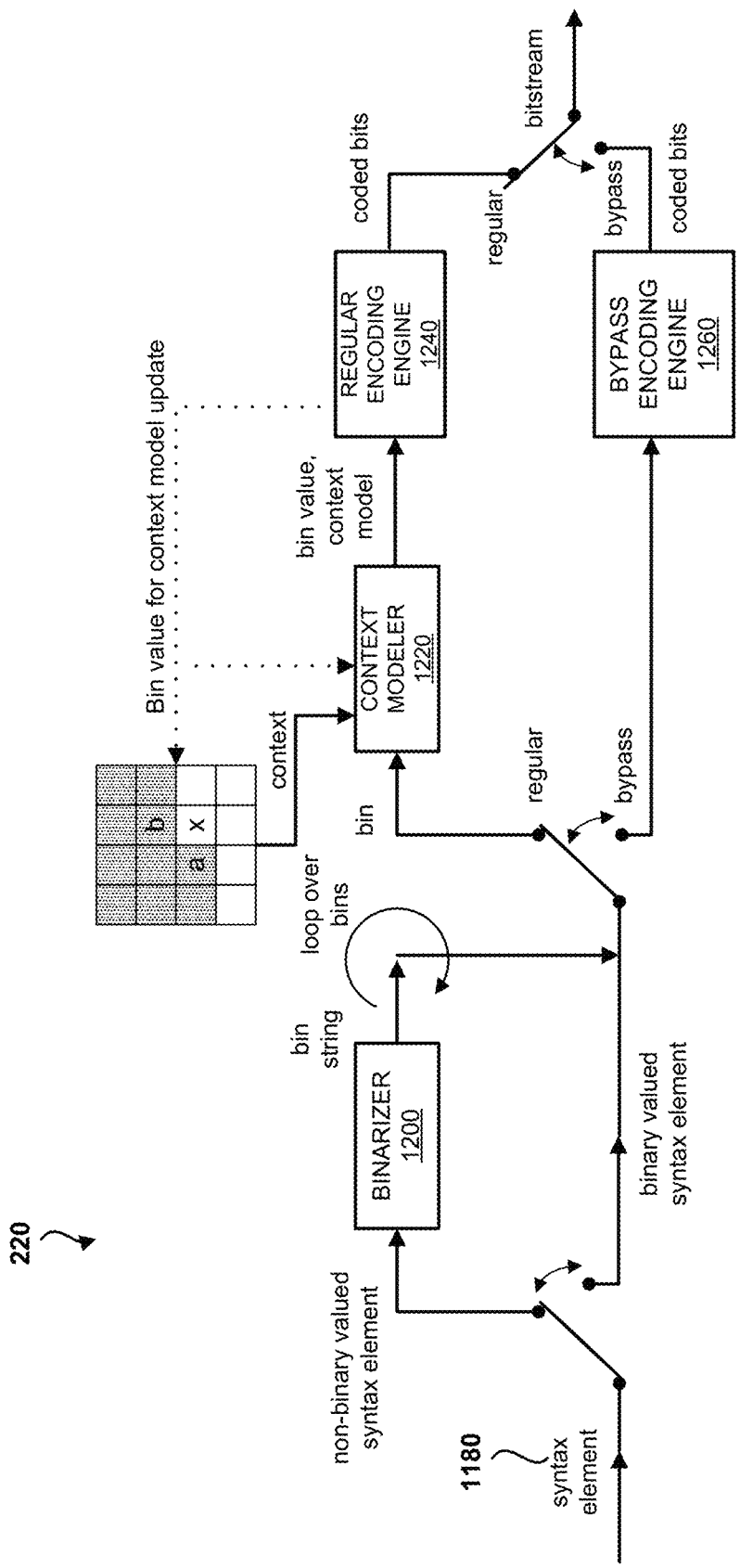
FIG. 12 is a block diagram illustrating a context adaptive binary arithmetic coder in a video encoder.

FIG. 12 is a block diagram of an example entropy encoding unit 220 that may be configured to perform CABAC in accordance with the techniques of this disclosure. A syntax element 1180 is input into the entropy encoding unit 220. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 1200. Binarizer 1200 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 1200 is fed to the binary arithmetic coding side of entropy encoding unit 220. That is, for a predetermined set of non-binary valued syntax elements, each bin type (e.g., bin 0) is coded before the next bin type (e.g., bin 1). Coding may be performed in either regular mode or bypass mode. In bypass mode, bypass encoding engine 1260 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 1220. Context modeler 1220 outputs the bin value and the probability state for the context the probability state σ, including the value of the LPS and the probability of the LPS occurring)). The context may be an initial context for a series of bins, or may be determined based on the coded values of previously coded bins. The identify of a context may be expressed and/or be determined based on a value of a variable ctxInc (context increment, such as the value of the ctxInc representing an increment to apply to a previous context). As described above, context modeler 1220 may update the state based on whether or not the received bin was the MPS or the LPS. After the context and probability state n is determined by context modeler 1220, regular encoding engine 1240 performs BAC on the bin value.

Figure 13:
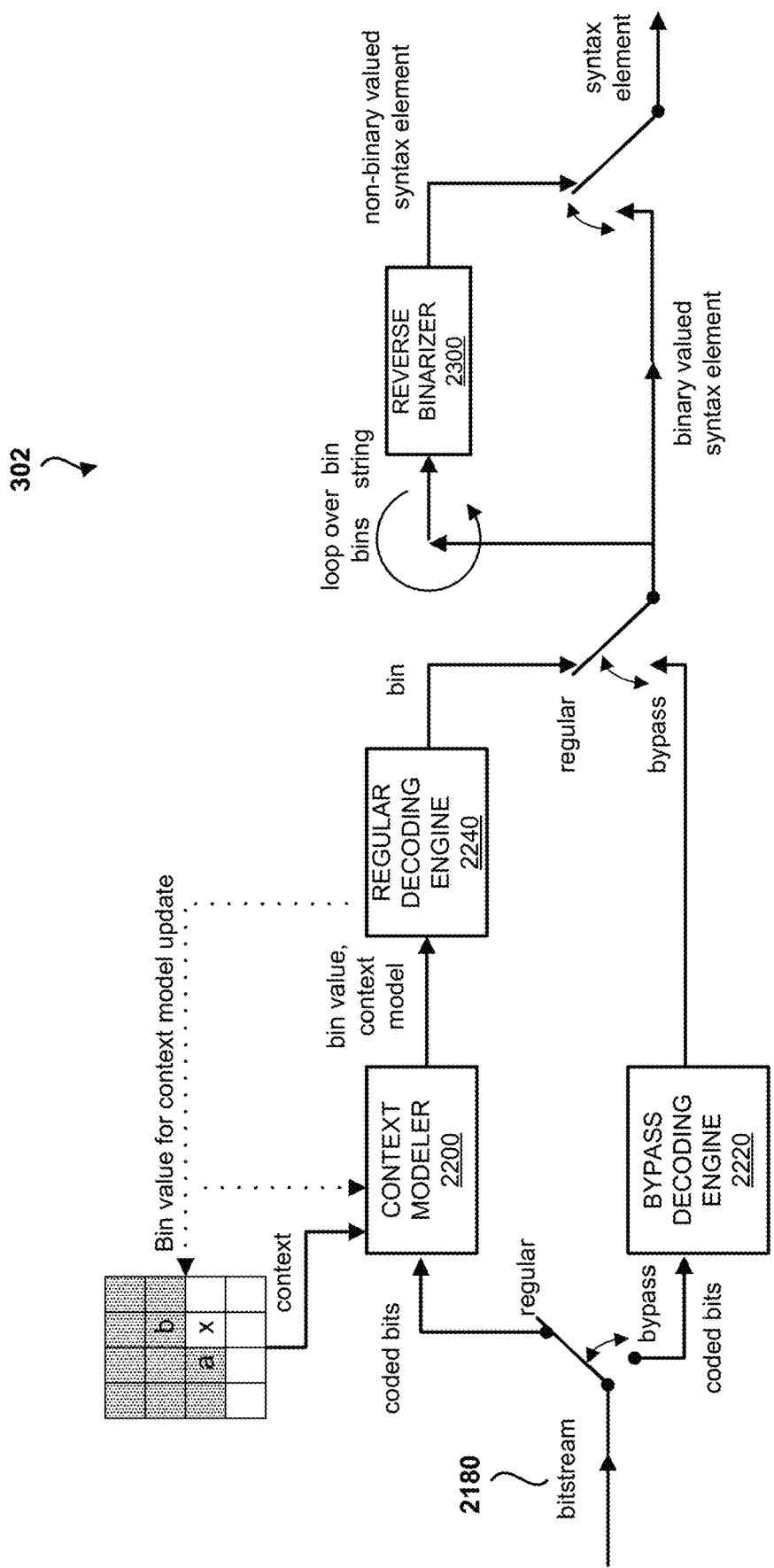
FIG. 13 is a block diagram illustrating a context adaptive binary arithmetic coder in a video decoder.

FIG. 13 is a block diagram of an example entropy decoding unit 302 that may be configured to perform CABAC in accordance with the techniques of this disclosure. The entropy decoding unit 302 of FIG. 13 performs CABAC in an inverse manner as that of entropy encoding unit 220 described in FIG. 12. Coded bits from bitstream 2180 are input into entropy decoding unit 302. The coded bits are fed to either context modeler 2200 or bypass decoding engine 2220 based on whether they were entropy coded using regular mode or bypass mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 2200 may determine a probability model for the coded bits and regular decoding engine 2240 may decode the coded bits to produce bins of non-binary valued syntax elements syntax elements themselves if binary-valued). After the context and probability state is determined by context modeler 2200, regular decoding engine 2240 performs BAC to decode the bin value. In other words, regular decoding engine 2240 may determine a probability state of a context, and decode a bin value based on previously coded bins and a current range. After decoding the bin, context modeler 2200 may update the probability state of the context based on the window size and the value of the decoded bin.

The techniques proposed in the '689 application may reduce the signaling overhead of LFNST index/flag based on the side-information obtained from coefficient coding. Specifically, the techniques of the '689 application may use the zeroed-out coefficient patterns are to infer LFNST indices. Additionally U.S. Provisional Application No. 62/861,828, filed Jun. 14, 2019 (hereinafter, the "'828 application" proposed an alternative signaling of the LFNST indices/flags and further proposed that signaling of the LFNST indices/flags are proposed to be done at the transform unit (TU) level instead of the coding unit (CU) level.

This disclosure describes various new context models for a CABAC engine to code the LFNST indices/flags. In this way, the techniques of this disclosure may enable a video coder to reduce the signaling overhead incurred by LFNST.

In accordance with one or more techniques of this disclosure, a video coder (e.g., a video encoder such as video encoder 200 or a video decoder such as video decoder 300) may perform context modeling/coding of the LFNST indices at the transform unit (TU) level. In WC Draft 5, the LFNST signaling is performed at the coding unit (CU) level. The '828 application and U.S. Provisional Application No. 62/830,125, filed Apr. 5, 2019 (hereinafter, the "'125 application") describe specific methods where signaling of the LFNST indices is done at the transform unit (TU) level. The approach advanced by the '828 application and the '125 application enables signaling of both MTS and LFNST related indices/flags at the same level (i.e., TV level). This disclosure advances techniques to cover context-based signaling of the LFNST indices/flags.

The following signaling techniques may be used individually or in any combination:

As a first example signaling technique, a video coder may context code LFNST indices/flags based on the value of the MTS indices/flags at the TU level. As one example, if the MTS index (mtsIdx) for a TU is MTS_DCT-2_DCT-2 (mtsIdx=0), the video coder may context code LFNST indices/flags at the TU level. As another example, if the MTS index for a TU is larger than 2 (mtsIdx>1, larger transforms), the video coder may context code then LFNST index/flag at the TU level. As another example, if the MTS index for the first TU is MIS_DCT-2_DCT-2 (mtsIdx=0) (or any other MTS index combination), the video coder may context code LFNST index/flag can be context coded for the first TU, and the LFNST index/flags for the remaining TUs may be inferred from the first TU.

As a second example signaling technique, a video coder may context code LFNST indices/flags can be context coded based on the block size of each TU (e.g. width and height of the TU block). For example, if the TU block size is 4×4 (e.g. width×height) or TU block size less/greater than a block size threshold (i.e. width×height<16×16), the video coder may context code the LFNST index/flag.

As a third example signaling technique, a video coder may context code LFNST indices/flags can be context coded based on whether TU is a Luma or a Chroma component. For example, if the TU block is a chroma block, the video coder may context code LFNST index/flag separately. Similarly, if the TU block is a lama block, the video coder may context code LFNST index/flag, separately.

As a fourth example signaling technique, a video coder may context code LFNST index/flag based on the TV depth. For example, if the TV depth is less than a threshold depth (e.g. tu.depth<threshold_depth), the video coder may context code the LFNST index. Example values of the threshold depth include, but are not limited to, 1, 2, 3, 4, and 5.

As a fifth example signaling technique, a video coder may context code LFNST index/flag based on the number of non-zero transform coefficients at the TU level. For example, if the number of non-zero coefficients after MTS coding is less than a threshold number, the video coder may context code the LFNST index. As one specific example, if the number of non-zero coefficients after MIS coding is less than 8 in a 32×32 TU on the top-left 8×8 sub-block of the TU, the video coder may context code the LFNST index.

Note that a single CV may include multiple TVs. In the example signaling techniques discussed above, a video coder may perform context coding (i) for each TU individually, as well as (ii) for a subset of TUs in a given CU (e.g. only the first TU in a given CU). In VVC Draft 5, a CU of size 128×128 contains multiple TVs, so the methods covered in this disclosure can be applied to such TVs.

In another example, context coding as detailed in the example signaling techniques discussed above can be performed for only the first TU in a given CU, and the signaling of the LFNST index can be skipped for other TVs. In this case the skipped TUs can infer (or reuse) the context coded LFNST indices/flags from the first TU.

In accordance with one or more techniques of this disclosure, a video coder (e.g., a video encoder such as video encoder 200 or a video decoder such as video decoder 300) may perform context modeling/coding of the LFNST indices at the coding unit (CU) level and other partitions. As discussed above, the video coder may perform context-based signaling of the LFNST indices/flags at the TU level. In addition to, or in place of, TV level signaling, the video coder may perform context coding of the LFNST index at other partitions and sub-block/units (e.g. context coding at the CU level). For example, similar to the design in VVC Draft 5, the video coder may context code LFNST indices/flags based on the certain CU level parameters and information. In this case, LFNST context coding can use the following signaling techniques individually or in any combination:

As a first example signaling technique, the video coder may context code LFNST index based on whether CU (i.e. or a similar/arbitrary partition type) is a Luma or a Chroma component. As one example, if the CU block is a chroma channel, the video coder may context code LFNST index/flag based on this information. As another example, if the CU block is a luma channel, the video coder may context code LFNST index/flag based on this information.

As a second example signaling technique, the video coder may context code LFNST index can be context coded based on the number of non-zero transform coefficients at the CU level (or an arbitrary partition type). For example, if the total number of non-zero coefficients after MTS coding is less than a threshold, the video coder may context code the LFNST index based on this information. As one specific example, if the total number of non-zero coefficients after MTS coding is less than 32 in a 128×128 CU, the video coder may context code the LFNST index can be context coded.

As a third example signaling technique, the video coder may context code LFNST index based on the block size of each CU, or any other partition (e.g. width and height of the CU or other partition blocks). For example, if the CU block size is 4×4 (e.g. width×height) or CU block size less/greater than a block size threshold (i.e. width×height<16×16), the video coder may context code LFNST index.

In accordance with one or more techniques of this disclosure, a video coder (e.g., a video encoder such as video encoder 200 or a video decoder such as video decoder 300) may perform context modeling/coding for unified LFNST index/flag with MTS index/flag signaling. In VVC Draft 5, the LFNST signaling is performed at the coding unit (CU) level. The '828 application proposes an alternative design to combine the signaling of the LFNST index/flag with the existing transform signaling (e.g. MTS index/flag signaling) such that signaling of the MTS and LFNST can be unified/harmonized. In this case, context modeling and coding of the LFNST indices and MTS indices can also be unified and harmonized to use the same contexts and context modeling.

The above-described techniques for context modeling/coding of the LFNST indices at the transform unit (TU) level, context modeling/coding of the LFNST indices at the coding unit (CU) level and other partitions, and context modeling/coding for unified LFNST index/flag with MTS index/flag signaling may be used individually, or may be used in any combination.

Figure 14:
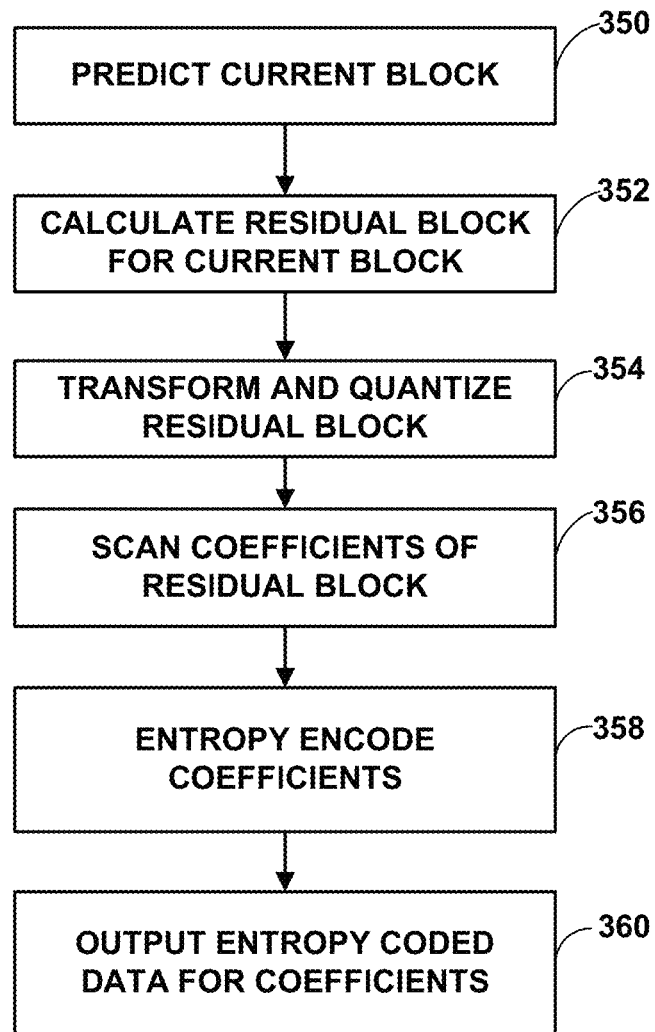
FIG. 14 is a flowchart illustrating an example encoding method.

FIG. 14 is a flowchart illustrating an example method for encoding a current block. The current block may comprise a current CU. Although described with respect to video encoder 200 (FIGS. 1 and 3), it should be understood that other devices may be configured to perform a method similar to that of FIG. 14.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). As discussed above, video encoder 200 may, in some examples, use a LFNST to transform the coefficients and encode a syntax element that specifies which UNST, if any, was used (e.g., an LFNST index). As also discussed above, video encoder 200 may select a context to encode the syntax element based on one or more parameters. As one example, video encoder 200 may select the context using the techniques discussed below with reference to FIG. 16.

Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 15:
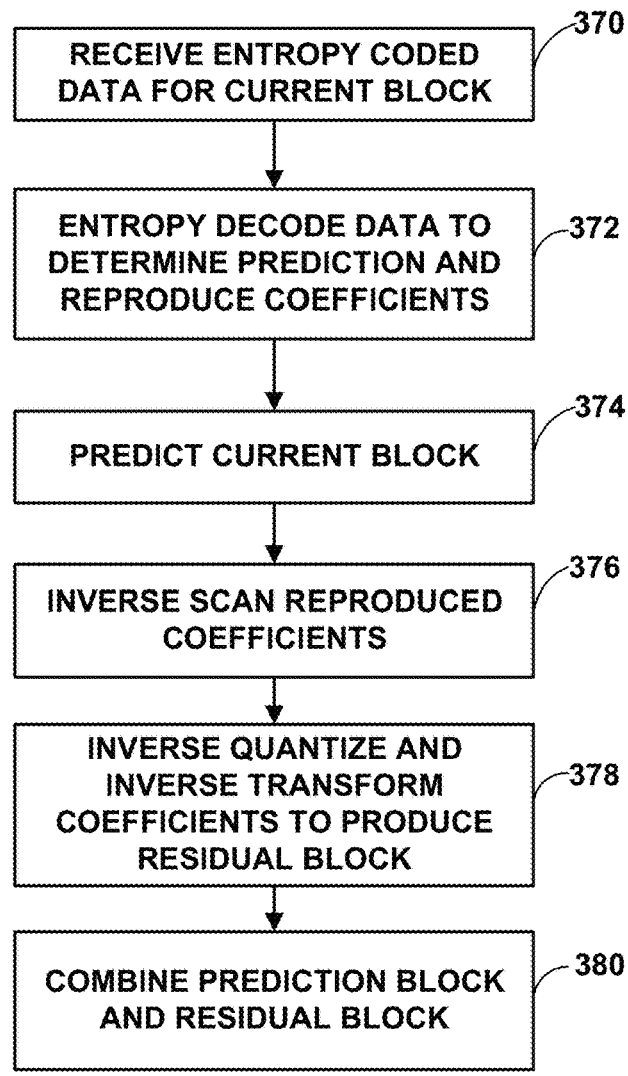
FIG. 15 is a flowchart illustrating an example decoding method.

FIG. 15 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 15.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). As discussed above, video decoder 300 may decode a syntax element that specifies which LFNST, if any, was used to transform the coefficients (e.g., an LFNST index) and use the indicated LFNST to inverse transform the coefficients. As also discussed above, video decoder 300 may select a context to decode the syntax element based on one or more parameters. As one example, video decoder 300 may select the context using the techniques discussed below with reference to FIG. 16. Video decoder 300 may ultimately decode the current block by combining the prediction block and the residual block (380).

Figure 16:
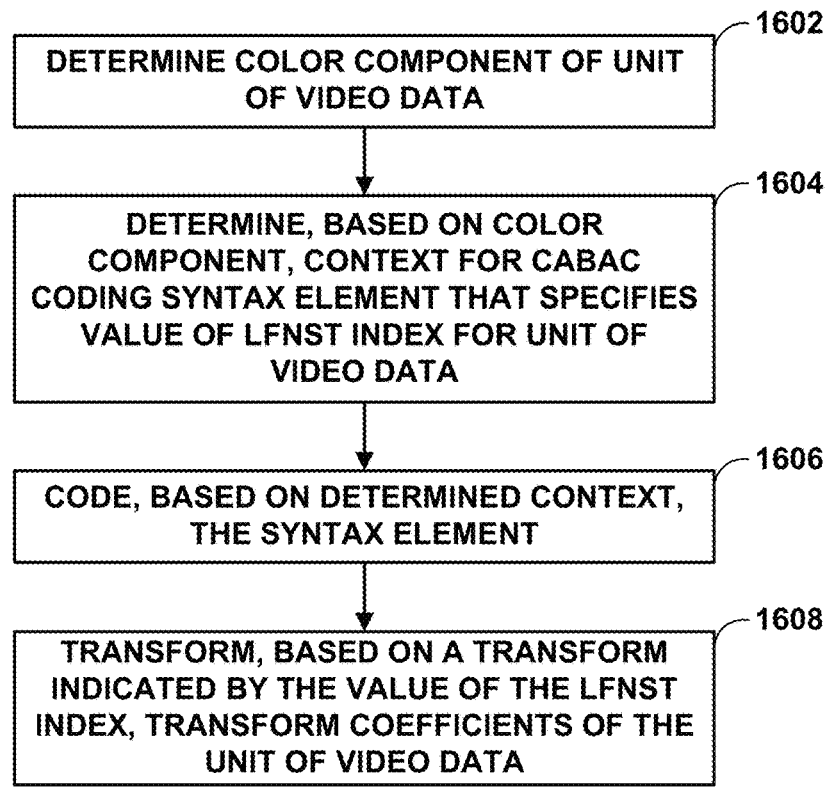
FIG. 16 is a flowchart illustrating an example method for context coding a syntax element that specifies a value of a low-frequency non-separable transform (LFNST) index for a unit of video data, in accordance with one or more techniques of this disclosure.

FIG. 16 is a flowchart illustrating an example method for context coding a syntax element that specifies a value of a low-frequency non-separable transform (LFNST) index for a unit of video data, in accordance with one or more techniques of this disclosure. The unit of video data may comprise a current TU or a current CU. Although described with respect to video decoder 300 (FIGS. 1 and 4), it should be understood that other devices may be configured to perform a method similar to that of FIG. 16, such as video encoder 200.

Video decoder 300 may determine a color component of a unit of video data (1602). For instance, video decoder 300 may determine whether a transform unit (TU) of video data is a luma TU or a chroma TU. As one specific example, entropy decoding unit 302 may determine a value of cIdx for the unit of video data.

Video decoder 300 may determine, based at least on the color component, a context for context-adaptive binary arithmetic coding (CABAL) a syntax element that specifies a value of a low-frequency non-separable transform (LFNST) index for the unit of video data (1604). For instance, entropy decoding unit 302 may determine a value of a context increment (ctxInc) for a bin of a lfnst_idx syntax element or a tu_lfnst_idx syntax element. As discussed above and in accordance with one or more techniques of this disclosure, entropy decoding unit 302 may determine the context (e.g., the value of ctxInc) based on at least on the color component (e.g., the value of cIdx). In this way, entropy decoding unit 302 may use different contexts when coding LFNST indices for different color components. For instance, entropy decoding unit 302 may a first context when coding LFNST indices for luma components and use a second, different, context when coding LFNST indices for chroma components.

Entropy decoding unit 302 may determine the context based on factors in addition to, or in place of the color component. Example factors include multiple transform selection (MTS) index, block size, number of non-zero transform coefficients, partition depth of the unit, and any other factor.

As one example, entropy decoding unit 302 may determine the context based on a value of a multiple transform selection (MTS) index for the unit of video data. For instance, entropy decoding unit 302 may obtain, for the unit of video data, a value of an MTS index (e.g., a value of tu_mts_idx for the unit of video data), and determine the context at least in part on the value of the MTS index. As one specific example, entropy decoding unit 302 may determine the context for the LFNST index as follows:

| | binIdx | | | | | |
|---|---|---|---|---|---|---|
| Syntax element | 0 | 1 | 2 | 3 | 4 | >=5 |
| lfnst_idx[ ][ ] | ( tu_mts_idx[ x0 ][ y0 ] = = 0 && treeType != SINGLE_TREE ) ? ( cIdx != 0 ? 2 : 1 ) : 0 | bypass | na | na | na | na |

As another example, entropy decoding unit 302 may determine the context based on a block size of the unit of video data. For instance, entropy decoding unit 302 may determine a length and/or a width of the unit of video data, and determine the context at least in part on the length and/or the width (e.g., whether or not the length is less than a length threshold and/or whether or not the width is less than a width threshold).

As another example, entropy decoding unit 302 may determine the context based on a number of non-zero transform coefficients at a level of the unit of video data. For instance, where the unit of video data is a TU, entropy decoding unit 302 may determine the number of non-zero transform coefficients at the TU level, and determine the context at least in part on the determined number of non-zero transform coefficients at the TU level.

As another example, entropy decoding unit 302 may determine the context based on a depth of the unit of video data in a partition structure. For instance, where the unit of video data is a TU, entropy decoding unit 302 may determine the depth of the TU in a partition structure, and determine the context at least in part on the determined depth.

Video decoder 300 may CABAC decode, based on the determined context and via a syntax structure for the unit of video data, the syntax element that specifies the value of the LFNST index for the unit of video data (1606). For instance, entropy decoding unit 302 may decode one or more bins of a lfnst_idx syntax element or a tu_lfnst_idx syntax element using the determined context. Entropy decoding unit 302 may provide the decoded bins to one or more components of video decoder 300, such as inverse transform processing unit 308.

In some examples, where the unit of video data is a TU of a plurality of Tus included in a CU, video decoder 300 may decode a separate syntax element for each TU that specifies the LFNST index for that TU. For instance, where a CU includes four TUs, video decoder 300 may decode four syntax elements, each specifying an LFNST index fora respective TU. However, in some examples, video decoder 300 may decode a syntax element that specifies an LFNST index for a first TU of a CU and infer LFNST indices for other TUs in the CU. In this way, video decoder 300 may enable video encoder 200 to refrain from encoding an LFNST index syntax element for each and every TU.

Video decoder 300 may transform, based on a transform indicated by the value of the LFNST index, transform coefficients of the unit of video data (1608). For instance, inverse transform processing unit 308 may inverse transform dequantized transform coefficients received from inverse quantization unit 30. The inverse transform used by inverse transform processing unit 308 may be selected based on the value of the LFNST index. For instance, inverse transform processing unit 308 may apply a first inverse transform when the syntax element that specifies the value of the LFNST index for the unit of video data specifies a value of zero, apply a second inverse transform when the syntax element that specifies the value of the LFNST index for the unit of video data specifies a value of one, and apply a third inverse transform when the syntax element that specifies the value of the LFNST index for the unit of video data specifies a value of two.

The techniques of this disclosure may present one or more advantages. For instance, selecting the context based on the color component and the MTS index may improve coding efficiency (e.g., reduce the number of bits used to represent video data at the same perceptual quality). The techniques of this disclosure were tested over VTM-5.0 on top of CTC configurations. These results are presented for AI and RA cases in Tables 1 and 2. Note that, in VTM-5.0, LFNST is disabled for low delay B (LDB) and low delay P (LDP) cases in CTC configurations.

TABLE 1

AI results on top of CTC over VTM5.0

| | All intra Main10 Over VTM-5.0 | | | | |
|---|---|---|---|---|---|
| | Y | U | V | EncT | DecT |
| Class A1 | 0.02% | −0.39% | −0.51% | 100% | 102% |
| Class A2 | 0.01% | −0.24% | −0.23% | 102% | 103% |
| Class B | 0.01% | −0.24% | −0.23% | 100% | 98% |
| Class C | 0.00% | −0.11% | −0.14% | 102% | 107% |
| Class E | 0.03% | −0.20% | −0.33% | 103% | 111% |
| Overall | 0.01% | −0.23% | −0.27% | 101% | 104% |
| Class D | 0.02% | 0.04% | −0.09% | 100% | 100% |
| Class F | 0.01% | −0.10% | −0.10% | 101% | 103% |

TABLE 2

RA results on top of CTC over VTM5.0

| | Random access Main10 Over VTM-5.0 | | | | |
|---|---|---|---|---|---|
| | Y | U | V | EncT | DecT |
| Class A1 | 0.00% | −0.36% | −0.06% | 101% | 102% |
| Class A2 | 0.00% | 0.10% | −0.15% | 98% | 97% |
| Class B | 0.02% | −0.13% | −0.36% | 101% | 101% |
| Class C | −0.05% | −0.20% | −0.08% | 99% | 99% |
| Class E | | | | | |
| Overall | −0.01% | −0.15% | −0.18% | 100% | 100% |
| Class D | 0.02% | −0.01% | 0.06% | 100% | 102% |
| Class F | −0.01% | −0.05% | 0.04% | 98% | 98% |

The following numbered examples may illustrate one or more aspects of the disclosure:

Example 1A. A method of coding video data, the method comprising: obtaining, for a transform unit (TU) of video data, a value of a low-frequency non-separable transform (LFNST) index or flag; and selectively context coding, in a syntax structure for the TU, the obtained value of the LFNST index or flag.

Example 2A. The method of example 1A, wherein selectively context coding the obtained value comprises context coding a tu_lfnst_idx syntax element.

Example 3A. The method of example 1A or 2A, further comprising: obtaining, for the TU, a value of a multiple transform selection (MTS) index; and context coding, in the syntax structure for the TU, the obtained value of the MIS index.

Example 4A. The method of example 3A, wherein context coding the obtained value of the MTS index comprises context coding a tu_mts_idx syntax element Example 5A. The method of example 3A or 4A, wherein selectively context coding the obtained value of the LFNST index or flag comprises selectively context coding the obtained value of the LFNST index or flag based on the obtained value of the MTS index.

Example 6A. The method of any of examples 1A-5A, wherein selectively context coding the obtained value of the LFNST index or flag comprises wherein selectively context coding the obtained value of the LFNST index or flag based on a size of the TU.

Example 7A. The method of any of examples 1A-6A, wherein selectively context coding the obtained value of the LFNST index or flag comprises wherein selectively context coding the obtained value of the LFNST index or flag based on whether the TU is a luma TU or a chroma TU.

Example 8A. The method of any of examples 1A-7A, wherein selectively context coding the obtained value of the LFNST index or flag comprises wherein selectively context coding the obtained value of the LFNST index or flag based on a depth of the TU.

Example 9A. The method of any of examples 1A-8A, wherein selectively context coding the obtained value of the LFNST index or flag comprises wherein selectively context coding the obtained value of the LFNST index or flag based on a number of non-zero transform coefficients at the TU level.

Example 10A. The method of any of examples 1A-9A, wherein the is a first TU in a coding unit (CU), the method further comprising: inferring, for other TUs in the CU, values of LFNST indices or flags based on the value of the LEN ST index or flag for the first TU.

Example 11A. The method of any of examples 1A-10A, wherein selectively context coding the obtained value of the LFNST index or flag comprises inferring the value of the LFNST index or flag.

Example 12A. The method of any of examples 1A-10A, wherein selectively context coding the obtained value of the LFNST index or flag comprises selectively coding the obtained value of the LFNST index or flag using context-adaptive binary arithmetic coding (CABAC).

Example 1B. A method of coding video data, the method comprising: obtaining, for a coding unit (CU) of video data, a value of a low-frequency non-separable transform (LFNST) index or flag; and selectively context coding, in a syntax structure for the CU, the obtained value of the LFNST index or flag.

Example 2B. The method of example 1B, wherein selectively context coding the obtained value comprises context coding a lfns_idx syntax element.

Example 3B. The method of any of examples 1B or 2B, wherein selectively context coding the obtained value of the LFNST index or flag comprises wherein selectively context coding the obtained value of the LFNST index or flag based on whether the CU is a luma CU or a chroma CU.

Example 4B. The method of any of examples 1B-3B, wherein selectively context coding the obtained value of the LFNST index or flag comprises wherein selectively context coding the obtained value of the LFNST index or flag based on number of non-zero transform coefficients at the CU level.

Example 5B. The method of any of examples 1B-4B, wherein selectively context coding the obtained value of the LFNST index or flag comprises wherein selectively context coding the obtained value of the LFNST index or flag based on a size of the CU.

Example 6B. The method of any of examples 1B-5B, wherein selectively context coding the obtained value of the LFNST index or flag comprises inferring the value of the LFNST index or flag.

Example 7B. The method of any of examples 1B-6B, wherein selectively context coding the obtained value of the LFNST index or flag comprises selectively coding the obtained value of the LFNST index or flag using context-adaptive binary arithmetic coding (CABAC).

Example 1C. A method of coding video data, the method comprising: obtaining, for a block of video data, a value of a low-frequency non-separable transform (LFNST) index or flag; obtaining, for the block of video data, a value of a multiple transform selection (MTS) index and context coding, in a coded video bitstream, a syntax element that represents both the obtained value of the LFNST index or flag and the obtained value of the MIS index.

Example 2C. The method of example 1C, wherein context coding the syntax element comprises coding the syntax element using context-adaptive binary arithmetic coding (CABAC).

Example 1D. The method of any of examples 1A-2C, wherein coding comprises decoding.

Example 2D. The method of any of examples 1A-2C, wherein coding comprises encoding.

Example 3D. A device for coding video data, the device comprising one or more means for performing the method of any of examples 1-2D.

Example 4D. The device of example 3D, wherein the one or more means comprise one or more processors implemented in circuitry.

Example 5D. The device of any of examples 3D and 4D, further comprising a memory to store the video data.

Example 6D. The device of any of examples 3D-5D, further comprising a display configured to display decoded video data.

Example 7D. The device of any of examples 3D-6D, wherein the device comprises one or more of a camera, a computer, a mobile device, a broadcast receiver device, or a set-top box.

Example 8D. The device of any of examples 3D-7D, wherein the device comprises a video decoder.

Example 9D. The device of any of examples 3D-8D, wherein the device comprises a video encoder.

Example 10D. A computer-readable storage medium having stored thereon instructions that, when executed, cause one or more processors to perform the method of any of examples 1A-2D.

Example 1E, Any combination of examples 1A-10D.

It is to be recognized that depending on the example, certain acts or events of any of the techniques described herein can be performed in a different sequence, may be added, merged, or left out altogether not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuity," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a color component of a unit of video data;
   obtaining, for the unit of video data, a value of a multiple transform selection (MTS) index;
   determining, based at least on the color component and the value of the MTS index, a value of a context increment (ctxInc) for context-adaptive binary arithmetic coding (CABAC) a syntax element that specifies a value of a low-frequency non-separable transform (LFNST) index for the unit of video data;
   CABAC decoding, based on the determined value of the context increment and via a syntax structure for the unit of video data, the syntax element that specifies the value of the LFNST index for the unit of video data; and
   inverse-transforming, based on a transform indicated by the value of the LFNST index, transform coefficients of the unit of video data.

2. The method of claim 1, further comprising:
determining a block size of the unit of video data,
wherein determining the value of the context increment comprises determining the value of the context increment based on the block size of the unit of video data.

3. The method of claim 1, further comprising:
determining a number of non-zero transform coefficients at a level of the unit of video data,
wherein determining the value of the context increment comprises determining the value of the context increment based on the number of non-zero transform coefficients.

4. The method of claim 1, wherein the unit of video data is a coding unit (CU) of video data.

5. The method of claim 1, wherein the unit of video data is a transform unit (TU) of video data.

6. The method of claim 5, further comprising:
determining a depth of the TU in a partition structure,
wherein determining the value of the context increment comprises determining the value of the context increment based on the depth of the TU.

7. The method of claim 5, wherein the TU is a first TU in a coding unit (CU) of video data, the method further comprising:
inferring, for other TUs in the CU, values of LFNST indices based on the value of the LFNST index for the first TU.

8. The method of claim 1, wherein the syntax element that specifies the value of the LFNST index for the unit of video data comprises a lfnst_idx syntax element or a tu_lfnst_idx syntax element.

9. The method of claim 1, wherein the value of the ctxInc represents an increment to apply to a previous context.

10. A method of encoding video data, the method comprising:
selecting, from a plurality of low-frequency non-separable transforms (LFNSTs), a LFNST having an LFNST index;
transforming, using the LFNST, transform coefficients of a unit of video data;
determining a color component of the unit of video data;
obtaining, for the unit of video data, a value of a multiple transform selection (MTS) index;
determining, based at least on the color component and the value of the MTS index, a value of a context increment (ctxInc) for context-adaptive binary arithmetic coding (CABAC) a syntax element that specifies a value of the LFNST index for the unit of video data; and
CABAC encoding, based on the determined context and via a syntax structure for the unit of video data, the syntax element that specifies the value of the LFNST index for the unit of video data.

11. The method of claim 10, further comprising:
determining a block size of the unit of video data,
wherein determining the value of the context increment comprises determining the value of the context increment based on the block size of the unit of video data.

12. The method of claim 10, further comprising:
determining a number of non-zero transform coefficients at a level of the unit of video data,
wherein determining the value of the context increment comprises determining the value of the context increment based on the number of non-zero transform coefficients.

13. The method of claim 10, wherein the unit of video data is a coding unit (CU) of video data.

14. The method of claim 10, wherein the unit of video data is a transform unit (TU) of video data.

15. The method of claim 14, further comprising:
determining a depth of the TU in a partition structure,
wherein determining the value of the context increment comprises determining the value of the context increment based on the depth of the TU.

16. The method of claim 14, wherein the TU is a first TU in a coding unit (CU) of video data, the method further comprising:
refrain from encoding syntax elements that specify values of LFNST indices for other TUs in the CU.

17. The method of claim 10, wherein the syntax element that specifies the value of the LFNST index for the unit of video data comprises a lfnst_idx syntax element or a tu_lfnst_idx syntax element.

18. A device for coding video data, the device comprising:
a memory; and
one or more processors implemented in circuitry and configured to:
determine a color component of a unit of video data;
obtain, for the unit of video data, a value of a multiple transform selection (MTS) index;
determine, based at least on the color component and the value of the MTS index, a value of a context increment (ctxInc) for context-adaptive binary arithmetic coding (CABAC) a syntax element that specifies a value of a low-frequency non-separable transform (LFNST) index for the unit of video data;
CABAC code, based on the determined context and via a syntax structure for the unit of video data, the syntax element that specifies the value of the LFNST index for the unit of video data; and
transform, based on a transform indicated by the value of the LFNST index, transform coefficients of the unit of video data.

19. The device of claim 18, wherein the one or more processors are further configured to:
determine a block size of the unit of video data,
wherein, to determine the value of the context increment, the one or more processors are configured to determine the value of the context increment based on the block size of the unit of video data.

20. The device of claim 18, wherein the one or more processors are further configured to:
determine a number of non-zero transform coefficients at a level of the unit of video data,
wherein, to determine the value of the context increment, the one or more processors are configured to determine the value of the context increment based on the number of non-zero transform coefficients.

21. The device of claim 18, wherein the unit of video data is a coding unit (CU) of video data.

22. The device of claim 18, wherein the unit of video data is a transform unit (TU) of video data.

23. The device of claim 22, wherein the one or more processors are further configured to:
determine a depth of the TU in a partition structure,
wherein, to determine the value of the context increment, the one or more processors are configured to determine the value of the context increment based on the depth of the TU.

24. The device of claim 22, wherein the TU is a first TU in a coding unit (CU) of video data, and wherein the one or more processors are configured to:
infer, for other TUs in the CU, values of LFNST indices based on the value of the LFNST index for the first TU.

25. The device of claim 18, wherein the syntax element that specifies the value of the LFNST index for the unit of video data comprises a lfnst_idx syntax element or a tu_lfnst_idx syntax element.

* * * * *